US012586400B2

(12) United States Patent　(10) Patent No.:　US 12,586,400 B2
Seto et al.　(45) Date of Patent:　Mar. 24, 2026

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Hidekazu Seto, Tokyo (JP); Keisui Okuma, Kanagawa (JP); Yusuke Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 17/837,564

(22) Filed: Jun. 10, 2022

(65) Prior Publication Data

US 2022/0406083 A1　Dec. 22, 2022

(30) Foreign Application Priority Data

Jun. 16, 2021　(JP) ................................. 2021-100210

(51) Int. Cl.
*G06V 30/19* (2022.01)
*G06V 30/22* (2022.01)

(52) U.S. Cl.
CPC ........ *G06V 30/19147* (2022.01); *G06V 30/22* (2022.01)

(58) Field of Classification Search
CPC ............. G06V 30/19147; G06V 30/22; G06V 30/148; G06V 30/28; G06V 30/19173; G06V 30/283; G06V 30/293; G06V 30/412; G06V 30/15; G06V 10/82
See application file for complete search history.

(56) References Cited

U.S. PATENT DOCUMENTS

| | | | | |
|---|---|---|---|---|
| 10,671,892 | B1 * | 6/2020 | Daskalov .............. | G06F 18/217 |
| 10,984,284 | B1 * | 4/2021 | Corcoran ............... | G06V 30/40 |
| 11,295,155 | B2 * | 4/2022 | Xu ........................ | G06V 30/153 |
| 11,341,758 | B1 * | 5/2022 | Stoltenberg .............. | G06N 3/08 |
| 2019/0311227 | A1 * | 10/2019 | Kriegman ........ | G06V 30/19173 |
| 2020/0311459 | A1 * | 10/2020 | Zagaynov ........ | G06V 30/19147 |
| 2020/0320325 | A1 | 10/2020 | Okuma ............ | G06V 30/19147 |
| 2021/0234975 | A1 | 7/2021 | Okuma ......... | G06T 2207/20081 |
| 2023/0062113 | A1 * | 3/2023 | Oishi ........................ | G06T 5/50 |
| 2024/0303971 | A1 * | 9/2024 | Zhao ..................... | G06V 10/30 |

FOREIGN PATENT DOCUMENTS

| | | | | | |
|---|---|---|---|---|---|
| EP | | 2275973 | B1 * | 5/2016 | ......... G06K 9/00442 |
| JP | | 2014-164485 | | 9/2014 | |

OTHER PUBLICATIONS

H. Pham et al., "Robust Handwriting Recognition with Limited and Noisy Data," 2020 17th International Conference on Frontiers in Handwriting Recognition (ICFHR), Dortmund, Germany, 2020, pp. 301-306, doi: 10.1109/ICFHR2020.2020.00062. (Year: 2020).*

(Continued)

*Primary Examiner* — Chan S Park
*Assistant Examiner* — Paulo Andres Garcia
(74) *Attorney, Agent, or Firm* — Venable LLP

(57)　ABSTRACT

A training image that simulates a character block entered by part of a character in another row is generated efficiently. A noise is added in the vicinity of an end portion of a character image so that a noise that seems to be caused by entering of part of a character in another row is reproduced for the character image representing a handwritten character.

10 Claims, 27 Drawing Sheets

(56) References Cited

OTHER PUBLICATIONS

R. Tiwari, A. Sen, A. Banerjee and K. Dey, "Empirical analysis of generalization through augmentation for classifying images of vernacular handwritten texts," 2020 14th (IIT), Al Ain, United Arab Emirates, 2020, pp. 186-191, doi: 10.1109/IIT50501.2020.9299031 (Year: 2020).*

Banerjee, Arindam. (2020). Generalization through augmentation in deep neural networks for handwritten character recognition, https://www.researchgate.net/publication/347835065_Generalization_through_augmentation_in_deep_neural_networks_for_handwritten_character_recognition (Year: 2020).*

Y. Du, C. Li, R. Guo, X. Yin, W. Liu, J. Zhou, Y. Bai, Z. Yu, Y. Yang, Q. Dang, H. Wang, PP-OCR: A Practical Ultra Lightweight OCR System, 2020, https://arxiv.org/abs/2009.09941 (Year: 2020).*

U.S. Appl. No. 17/837,523, filed Jun. 10, 2022.

U.S. Appl. No. 17/837,657, filed Jun. 10, 2022.

* cited by examiner

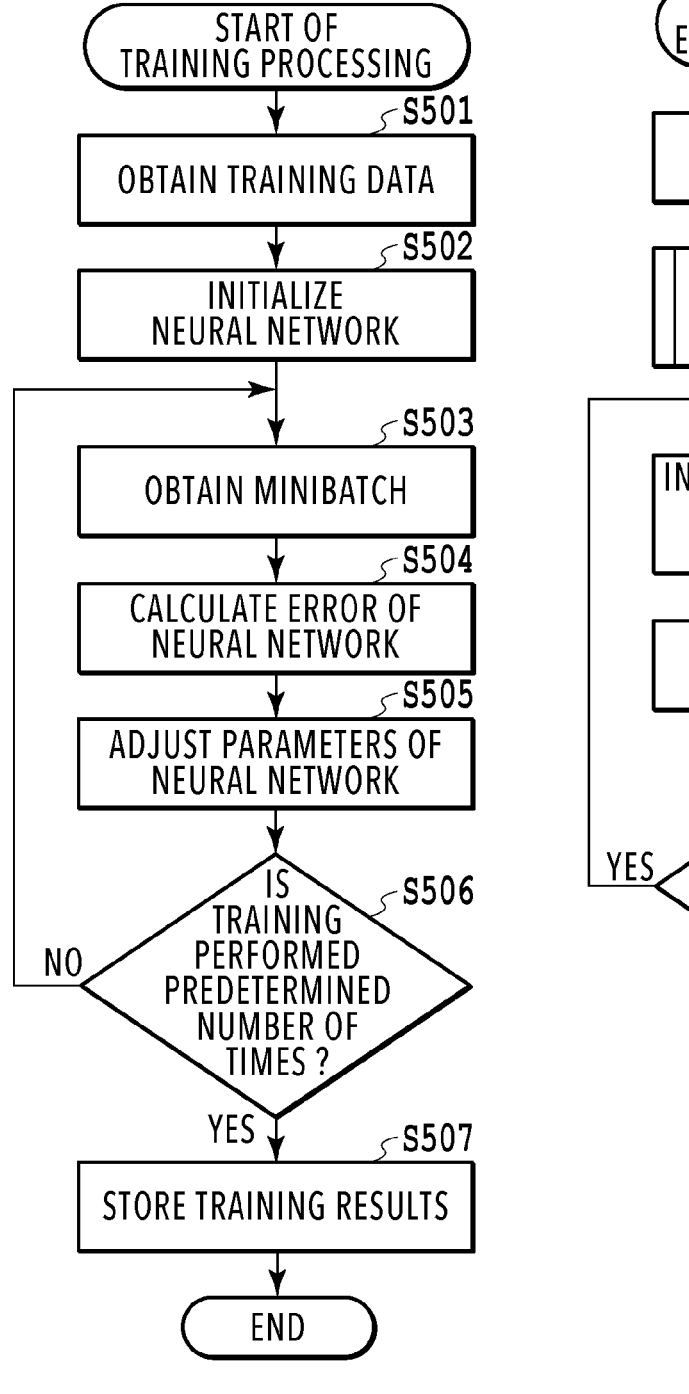

START OF
TRAINING PROCESSING

S501
OBTAIN TRAINING DATA

S502
INITIALIZE
NEURAL NETWORK

S503
OBTAIN MINIBATCH

S504
CALCULATE ERROR OF
NEURAL NETWORK

S505
ADJUST PARAMETERS OF
NEURAL NETWORK

S506
IS
TRAINING
PERFORMED
PREDETERMINED
NUMBER OF
TIMES ?
NO
YES

S507
STORE TRAINING RESULTS

END

FIG.5A

START OF
ESTIMATION PROCESSING

S511
LOAD TRAINED MODEL

S512
PROCESSING-TARGET
IMAGE GENERATION
PROCESSING

S513
INPUT PROCESSING-TARGET
IMAGE OF INTEREST TO
TRAINED MODEL

S514
TRANSMIT
PROCESSING RESULTS

S515
IS THERE
UNPROCESSED
PROCESSING-TARGET
IMAGE ?
YES
NO

END

CHARACTER STRING IMAGE

901

902

903

904

CUT OUT FROM
BOTTOM END

1201

NOISE IMAGE    FIG.12B

CUT OUT FROM
TOP END

1202

NOISE IMAGE    FIG.12C

1200

HEIGHT

WIDTH

CHARACTER
IMAGE

CUT OUT FROM
RIGHT END

1203

NOISE IMAGE    FIG.12D

1204

CUT OUT FROM
LEFT END

NOISE IMAGE    FIG.12E

CHARACTER STRING IMAGE

EXTEND FRAME IN UPWARD DIRECTION

FRAME-EXTENDED IMAGE

EXTEND FRAME IN DOWNWARD DIRECTION

FRAME-EXTENDED IMAGE

EXTEND FRAME IN LEFTWARD DIRECTION

FRAME-EXTENDED IMAGE

EXTEND FRAME IN RIGHTWARD DIRECTION

FRAME-EXTENDED IMAGE

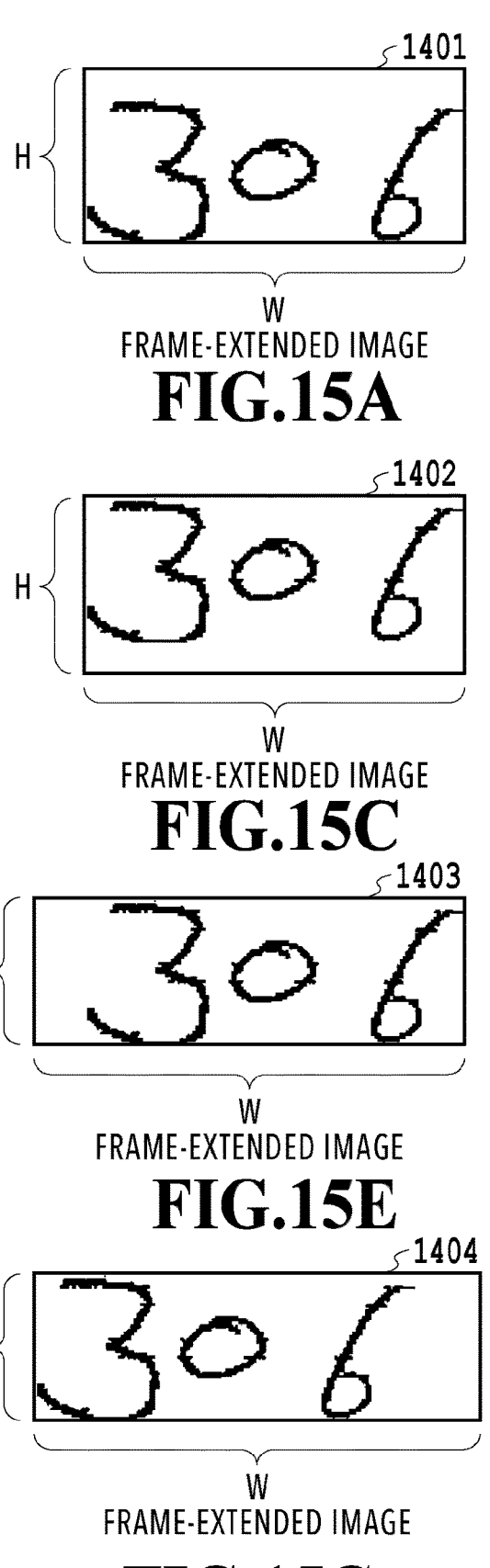
1401
H
W
FRAME-EXTENDED IMAGE
FIG.15A
1402
H
W
FRAME-EXTENDED IMAGE
FIG.15C
1403
H
W
FRAME-EXTENDED IMAGE
FIG.15E
1404
H
W
FRAME-EXTENDED IMAGE
FIG.15G
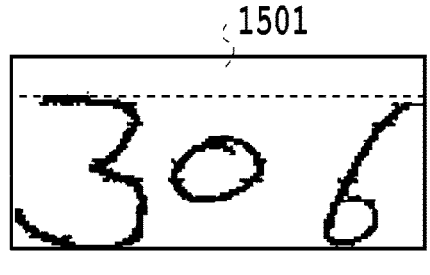
1501
FIG.15B
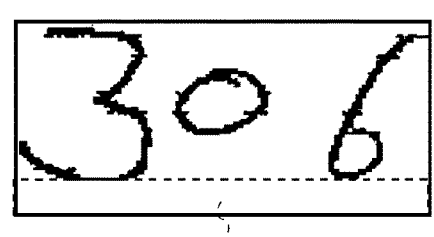
1502
FIG.15D
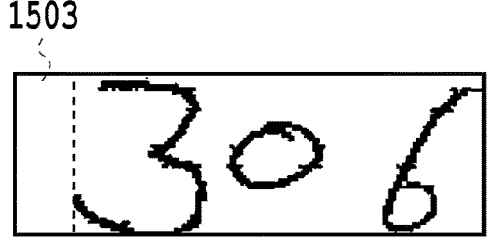
1503
FIG.15F
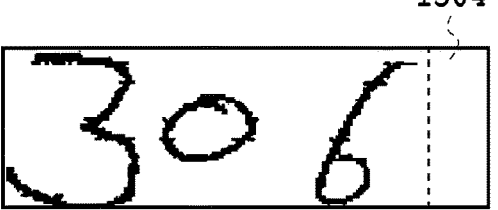
1504
FIG.15H
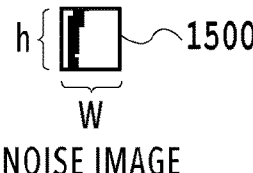
h
W
1500
NOISE IMAGE
FIG.15I

1700

CHARACTER ROW
SEPARATION PROCESSING

1701

1702

2100
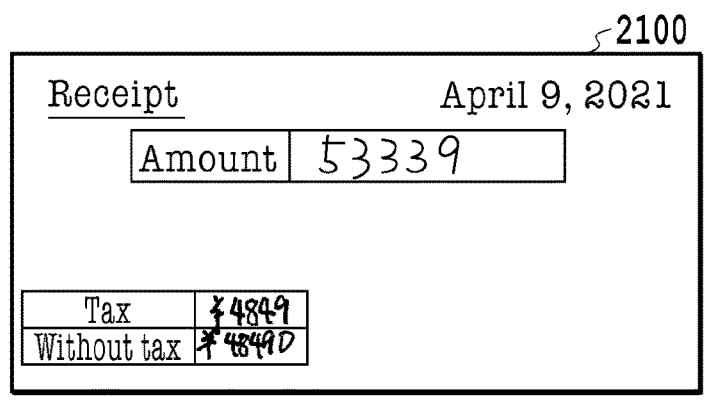
Receipt                    April 9, 2021
| Amount | 53339 |
| Tax | ¥4849 |
| Without tax | ¥4849D |
FIG.21A
2101
53339
¥4849
¥4849D
FIG.21B
2101
2102
53339
2103
¥4849
¥4849D
FIG.21C
2103    CHARACTER ROW SEPARATION PROCESSING    2104
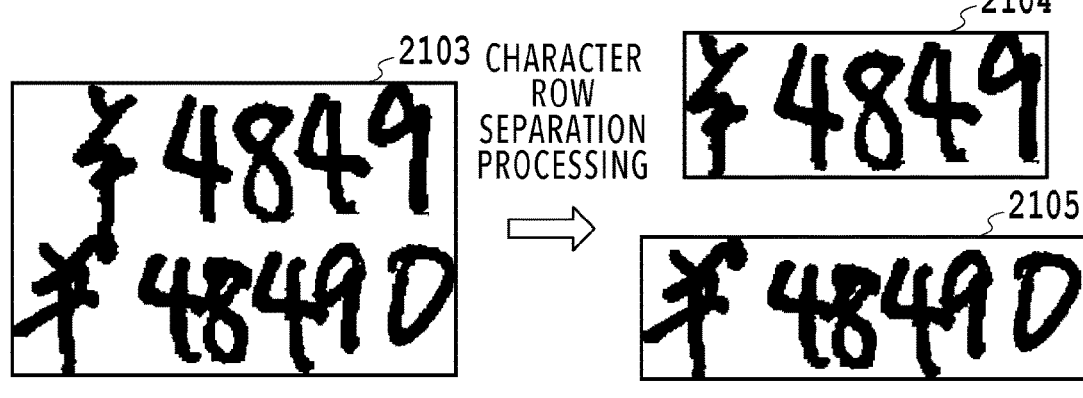
2105
FIG.21D

2301
2300
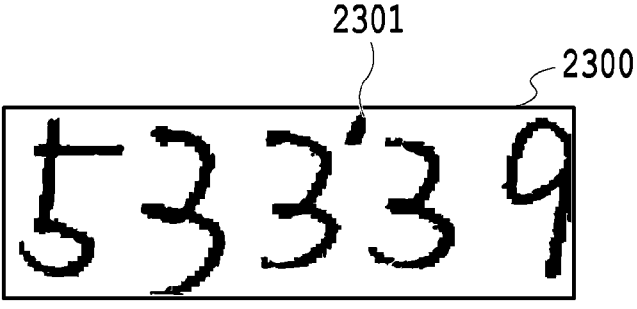
REMOVAL OF
ISOLATED POINT NOISE
2302
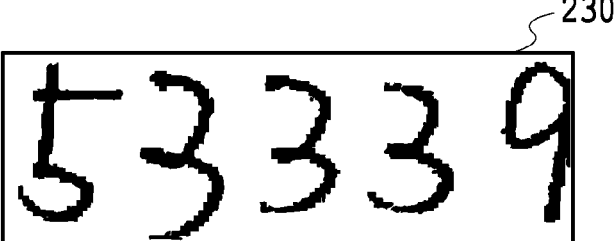
FIG.23

IMAGE PROCESSING APPARATUS, CONTROL METHOD THEREOF, AND STORAGE MEDIUM

BACKGROUND OF THE INVENTION

Field of the Invention

The present disclosure relates to a technique to generate training data.

Description of the Related Art

In recent years, due to the change in working environment accompanying the spread of computers, the chances that a business document is scanned and computerized are increasing in number. In the computerization-target documents, a document to which a handwritten character is input, for example, such as a receipt, exists and in order to utilize computerized documents for data analysis, such as aggregation, character data is extracted by performing optical character recognition (OCR) for a handwritten character area. Here, as one of the OCR techniques that cope with handwritten characters, there is a method that uses a trained model obtained by performing machine learning, such as a neural network. In this method, first, training is performed by using training data (also called teacher data) that pairs a character image in which a handwritten character is drawn and a correct answer class obtained by converting a character included in the character image into text. Then, by inputting the character image including handwritten characters to the trained model, it is made possible to utilize the handwritten character in the scanned document as text information.

In general, in order to perform image recognition by machine learning, a large number of images is necessary as training data, but various shapes exist as handwritten characters and it is difficult to comprehensively collect images of handwritten characters in all patterns. Consequently, data augmentation of training data is performed generally by performing deformation processing, such as rotation and enlargement/reduction, for the character image for the prepared training data. Then, as one example of deformation processing, a technique has been proposed (Japanese Patent Laid-Open No. 2014-164485), which randomly adds noises to a character image in order to simulate deterioration or the like that is caused by a scan.

It is not uncommon that the character that is handwritten in a business form, such as a receipt, is written in such a manner that the character protrudes from a predetermined frame (entry field) provided within the business form. For the scanned image of a document including a handwritten character that protrudes from a predetermined frame such as this, before the OCR is performed for the handwritten character area, it is general to perform processing (character row separation processing) to separate character rows for each character row by, for example, dividing the character rows using the ruled line within the business form as a reference and so on. FIG. 17 shows a specific example of the character row separation processing. In the example in FIG. 17, a rectangular area (character block) 1700 of handwritten characters, which is extracted from the scanned image of a receipt including the handwritten amount, is separated into two character blocks 1701 and 1702. Here, it can be seen that the character block 1702 is entered by part of the character that should originally be included within the character block 1701.

In order to obtain a high character recognition accuracy in the OCR using a trained model for the character block entered by part of a character in another row as described above, it is necessary to perform training sufficiently with an image entered by part of a character in another row (in the following, called "part-entered image"). Here, in the example in FIG. 17, a character enters from above, but the similar entering may occur from below or from left and right. However, it is difficult to collect and create a large number of mixed images that comprehensively include various entering aspects from every direction. Consequently, it is considered to augment training data by data augmentation, but with the method of adding noises to random positions within an image as disclosed in Japanese Patent Laid-Open No. 2014-164485, it is difficult to efficiently generate the part-entered image as illustrated in FIG. 17.

SUMMARY OF THE INVENTION

The image processing apparatus according to the present disclosure is an image processing apparatus and including: a memory that stores a program; and a processor that executes the program to perform: adding a noise to a character image representing a handwritten character; and generating training data for machine learning by associating a character image to which the noise is added and a correct answer class, wherein in the adding, the noise is added in the vicinity of an end portion of the character image.

Further features of the present disclosure will become apparent from the following description of exemplary embodiments with reference to the attached drawings.

BRIEF DESCRIPTION OF THE DRAWINGS

FIG. 5A is a flowchart showing a flow of training processing and FIG. 5B is a flowchart showing a flow of estimation processing;

FIG. 12A is a diagram showing a character image and FIG. 12B to FIG. 12E are each a diagram showing a specific example of processing to cut out a noise image from the character image;

FIG. 15A to FIG. 15H are diagrams showing specific examples of a noise addition area within a frame-extended image and FIG. 15I is a diagram showing a noise image;

FIG. 21A to FIG. 21D are diagrams showing specific examples of processing-target image generation processing;

FIG. 23 is a diagram showing a specific example of isolated point noise removal processing;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Image Processing System>

Figure 1:
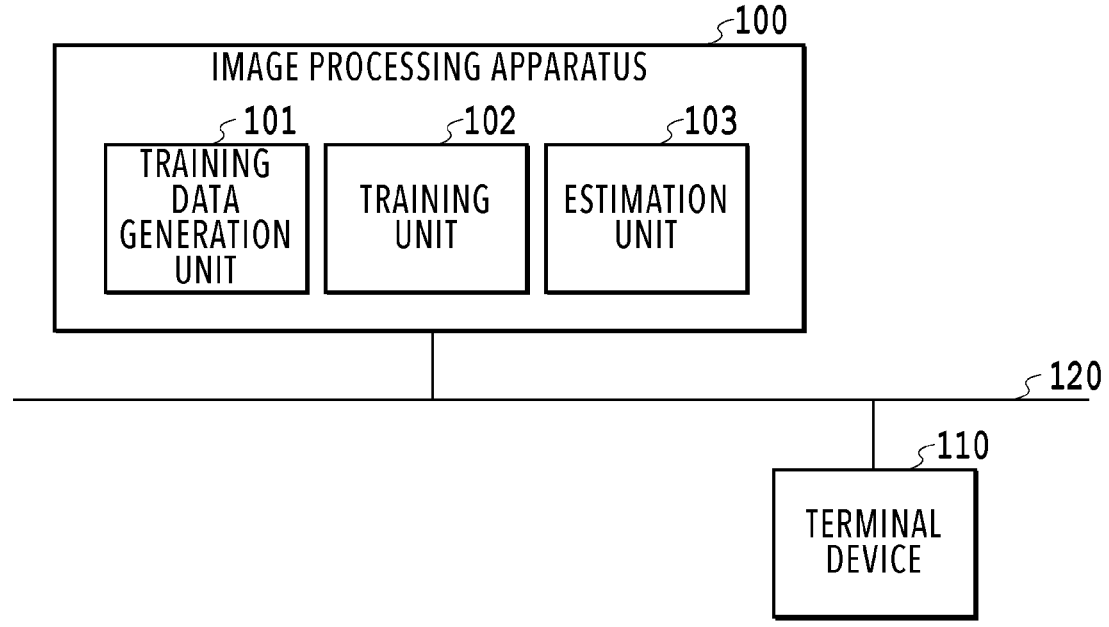
FIG. 1 is a diagram showing an example of a configuration of an image processing system.

FIG. 1 a diagram showing an example of the configuration of an image processing system according to the present embodiment. As shown in FIG. 1, the image processing system includes an image processing apparatus 100 and a terminal device 110 and the image processing apparatus 100 and the terminal device 110 are connected to each other via a network 120.

The image processing apparatus 100 has each function unit of a training data generation unit 101, a training unit 102, and an estimation unit 103. The training data generation unit 101 generates training data for the training unit 102 to perform training of a model of a neural network. The training data is data that pairs a character image in which a handwritten character is drawn and a correct answer class obtained by converting a handwritten character included in the character image into text. Details of the training data that is generated in the training data generation unit 101 will be described later by using FIG. 4.

The training unit 102 performs training of a model of a neural network by using the training data generated by the training data generation unit 101. The model of a neural network that is generated by the training unit 102 is referred to as a "trained model". The training processing by the training unit 102 will be described later by using FIG. 5A. The estimation unit 103 outputs class information of the input character image by estimation using a trained model generated by the training unit 102. The estimation processing by the estimation unit 103 will be descried later by using FIG. 5B.

The terminal device 110 is, for example, an information processing apparatus, such as a PC and a smartphone. It is possible for a user or a system administrator to access the image processing apparatus 100 from the terminal device 110 via the network 120 and check instructions to perform training and the trained model.

The network 120 is a LAN, a public line (WAN) or the like, which connects the image processing apparatus 100 and the terminal device 110 and transmission and reception of data are performed between the image processing apparatus 100 and the terminal device 110 via the network 120.

The above-described system configuration is an example and only the functions necessary for the explanation in the present embodiment are shown schematically. Each apparatus or device may have any logic configuration as long as the configuration is capable of implementing the technique that is disclosed in the present embodiment. For example, in the configuration shown in FIG. 1, the estimation unit 103 is incorporated in the image processing apparatus 100, but it may also be possible for another apparatus separate from the image processing apparatus 100 to have the estimation unit 103.

<Hardware Configuration>

Figure 2A:
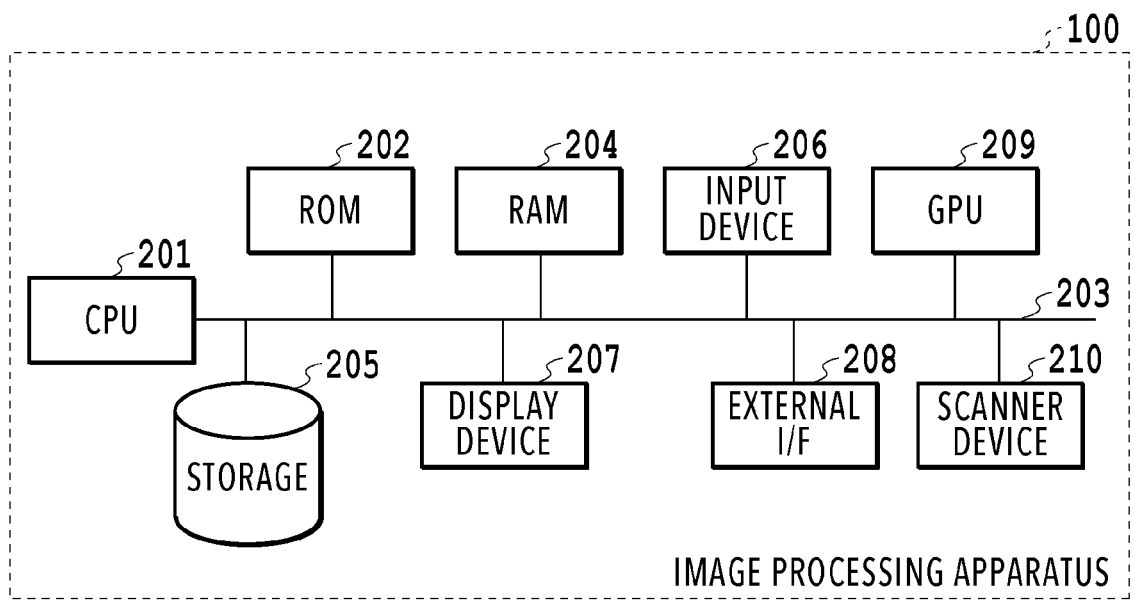
FIG. 2A is a block diagram showing an example of a hardware configuration of an image processing apparatus and FIG. 2B is a block diagram showing an example of a hardware configuration of a terminal device.
Figure 2B:
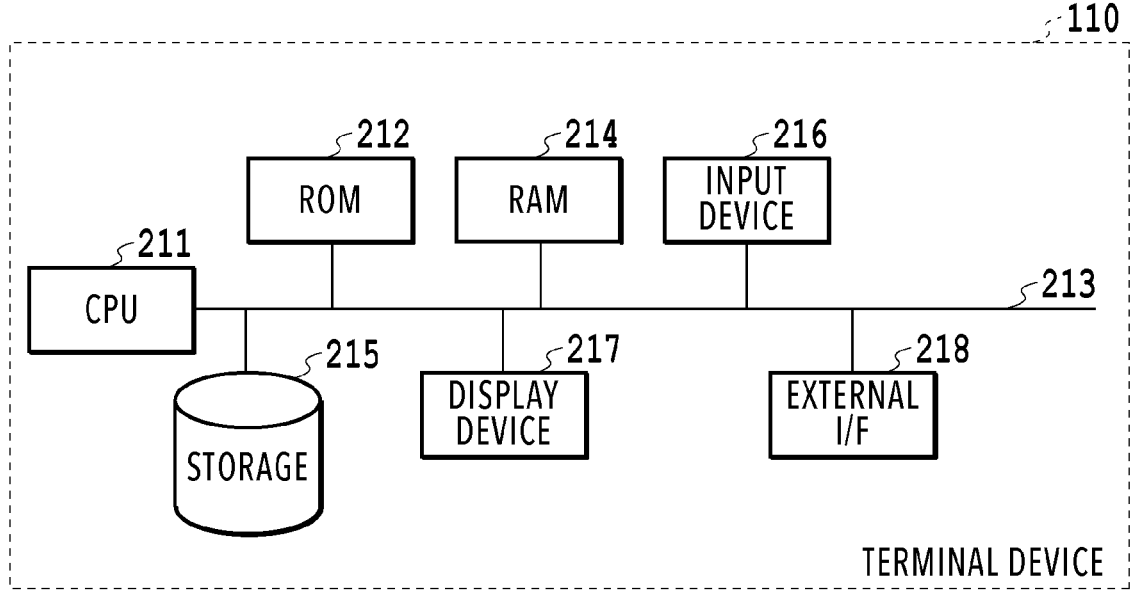

FIG. 2A and FIG. 2B are each a block diagram showing an example of the hardware configuration of the image processing apparatus 100 and the terminal device 110, respectively, in the image processing system shown in FIG. 1.

FIG. 2A is a diagram showing the hardware configuration of the image processing apparatus 100. As shown in FIG. 2A, the image processing apparatus 100 includes a CPU 201, a ROM 202, a RAM 204, a storage 205, an input device 206, a display device 207, an external I/F 208, and a GPU 209 and each unit is connected to one another via a data bus 203.

The CPU 201 is a control device for controlling the entire operation in the image processing apparatus 100. The CPU 201 activates the system of the image processing apparatus 100 by executing a boot program stored in the ROM 202 and executes programs stored in the storage 205. Further, the CPU 201 performs part of the calculation processing that is performed by the training data generation unit 101 and the training unit 102 in cooperation with the GPU 209. The ROM 202 is implemented by a nonvolatile memory and is a storage device that stores the boot program that activates the image processing apparatus 100 and the like. The data bus 203 is a communication path for performing transmission and reception of data between the devices constituting the image processing apparatus 100. The RAM 204 is implemented by a volatile memory and is a storage device that is used as a work memory at the time of the CPU 201 executing programs. The storage 205 is implemented by an HDD (Hard Disk Drive), an SSD (Solid State Drive) and the like and is a large-capacity storage device for storing programs and training data. The programs here include programs for instructing the CPU 201 to perform training data generation processing, training processing, and estimation processing, to be described later. By the CPU 201 executing these programs, the training data generation unit 101, the training unit 102, and the estimation unit 103 described previously are implemented. The input device 206 is implemented by a mouse, a keyboard and the like and receives an operation input to the image processing apparatus 100 from an engineer. The display device 207 is implemented by a liquid crystal display and the like and displays and outputs various setting screens and the like of the image processing apparatus 100 to an engineer. The external I/F 208 is an interface for performing transmission and reception of various kinds of data, commands and the like with the terminal device 110 via the network 120. The GPU 209 is a computing processing device specialized in image processing. The GPU 209 performs computing and the like for updating parameters constituting a training model based on given training data under the control by the CPU 201. A scanner device 210 is a device that scans a document, such as a business form, by using a CCD or the like and generates image data by converting obtained electric signal data.

FIG. 2B is a diagram showing the hardware configuration of the terminal device 110. As shown in FIG. 2B, the terminal device 110 includes a CPU 211, a ROM 212, a RAM 214, a storage 215, an input device 216, a display device 217, and an external I/F 218 and each is connected to one another via a data bus 213. The CPU 211 is a control device for controlling the entire operation in the terminal device 110. The CPU 211 activates the system of the terminal device 110 by executing the boot program stored in the ROM 212 and executes programs stored in the storage 215. The ROM 212 is implemented by a nonvolatile memory and is a storage device that stores the boot programs that activates the terminal device 110, and the like. The data bus 213 is a communication path for performing transmission and reception of data between the devices constituting the terminal device 110. The RAM 214 is implemented by a volatile memory and is a storage device that is used as a work memory at the time of the CPU 211 executing image processing programs. The storage 215 is implemented by an HDD (Hard Disk Drive), an SSD (Solid State Device) or the like and is a storage device that stores the programs and the like described previously. The input device 216 is implemented by a mouse, a keyboard and the like and receives an operation input to the terminal device 110 from a user. The display device 217 is implemented by a liquid crystal display and the like and displays and outputs various kinds of information to a user. The external I/F 218 is an interface for performing transmission and reception of various kinds of data, commands and the like with the image processing apparatus 100 via the network 120.

<About Training Data>

Next, training data that is a pair of a character image and a correct answer class, which is used for training of a neural network, is explained. Here, the terms are defined. An image obtained by cutting out a handwritten character area for each character from a scanned image of an actually handwritten document is called a "character image". Then, an image obtained by the training data generation unit 101 performing deformation processing for the character image is called a "training image".

<<Character Image Database>>

Figure 3:
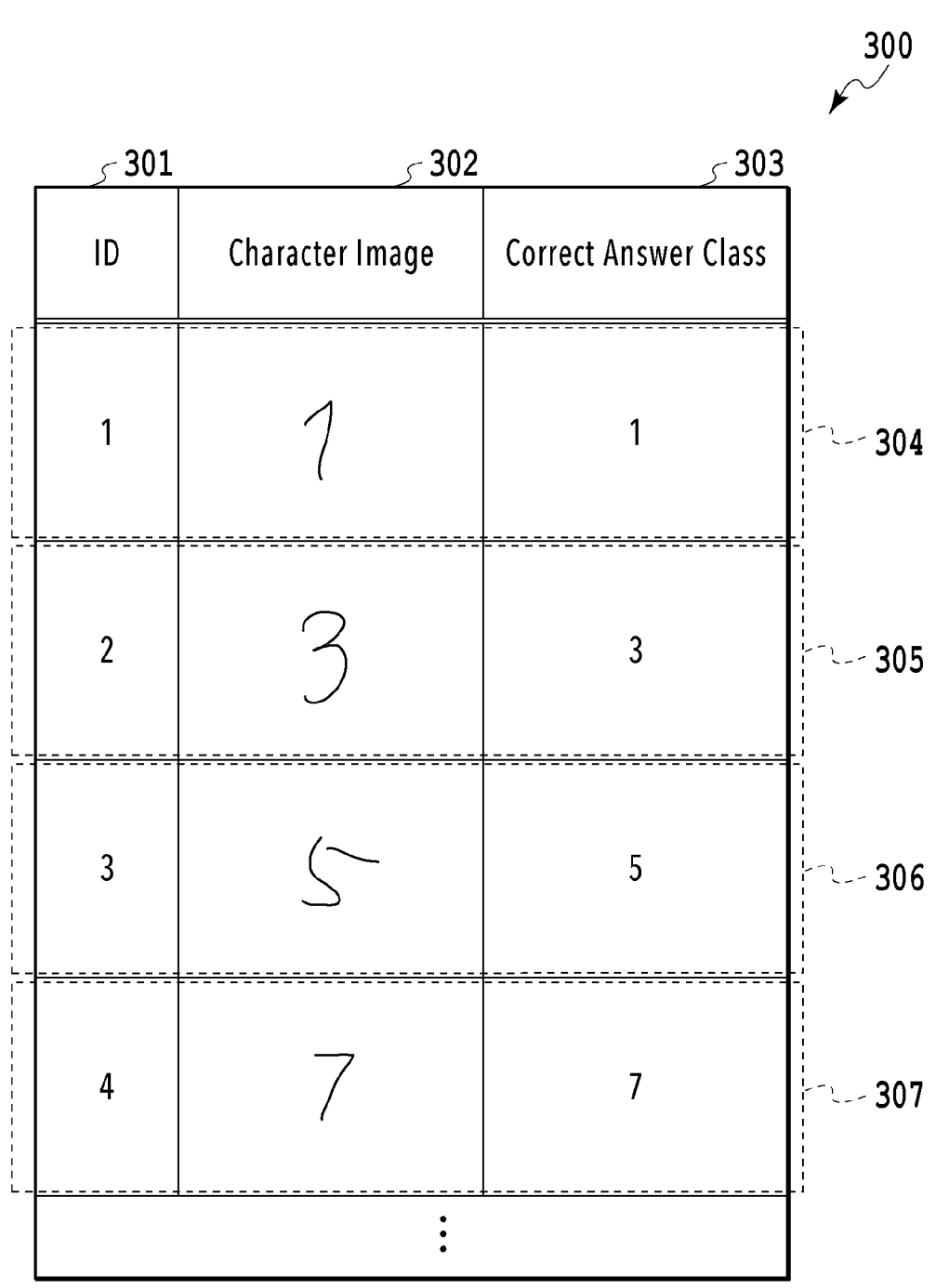
FIG. 3 is a diagram showing an example of a table as a character image DB.

FIG. 3 is a diagram showing an example of a table as a database (in the following, described as "character image DB") for storing character images. In a table 300 as the character image DB, data or a value corresponding to each item of "Record ID" 301, "Character Image" 302, and "Correct Answer Class" 303 is stored. It is assumed that to the character image DB, part of the storage area of the storage 205 is allocated dedicatedly "Record ID" 301 is a field to which identification information for uniquely identifying each record within the table 300 is input. This record ID is added to a record each time the record is added to the table 300. "Character Image" 302 is a field to which image data corresponding to each handwritten character is input. "Correct Answer Class" 303 is a field in which a handwritten character included within the character image is stored as text data. Here, in the table 300 shown in FIG. 3, four records 304 to 307 associating the character image of a handwritten figure and the correct answer class thereof each other are illustrated.

As described previously, each character image that is stored in the table 300 is obtained by cutting out only the handwritten character portion for each character from an image obtained by scanning a document and the like including handwritten characters, but the obtaining method of a character image is not limited to this. Further, instead of comprehensively managing a plurality of character images as in the table 300 shown in FIG. 3, for example, it may also be possible to perform management by providing a table for each correct answer class.

<<Training Image Database>>

Figure 4:
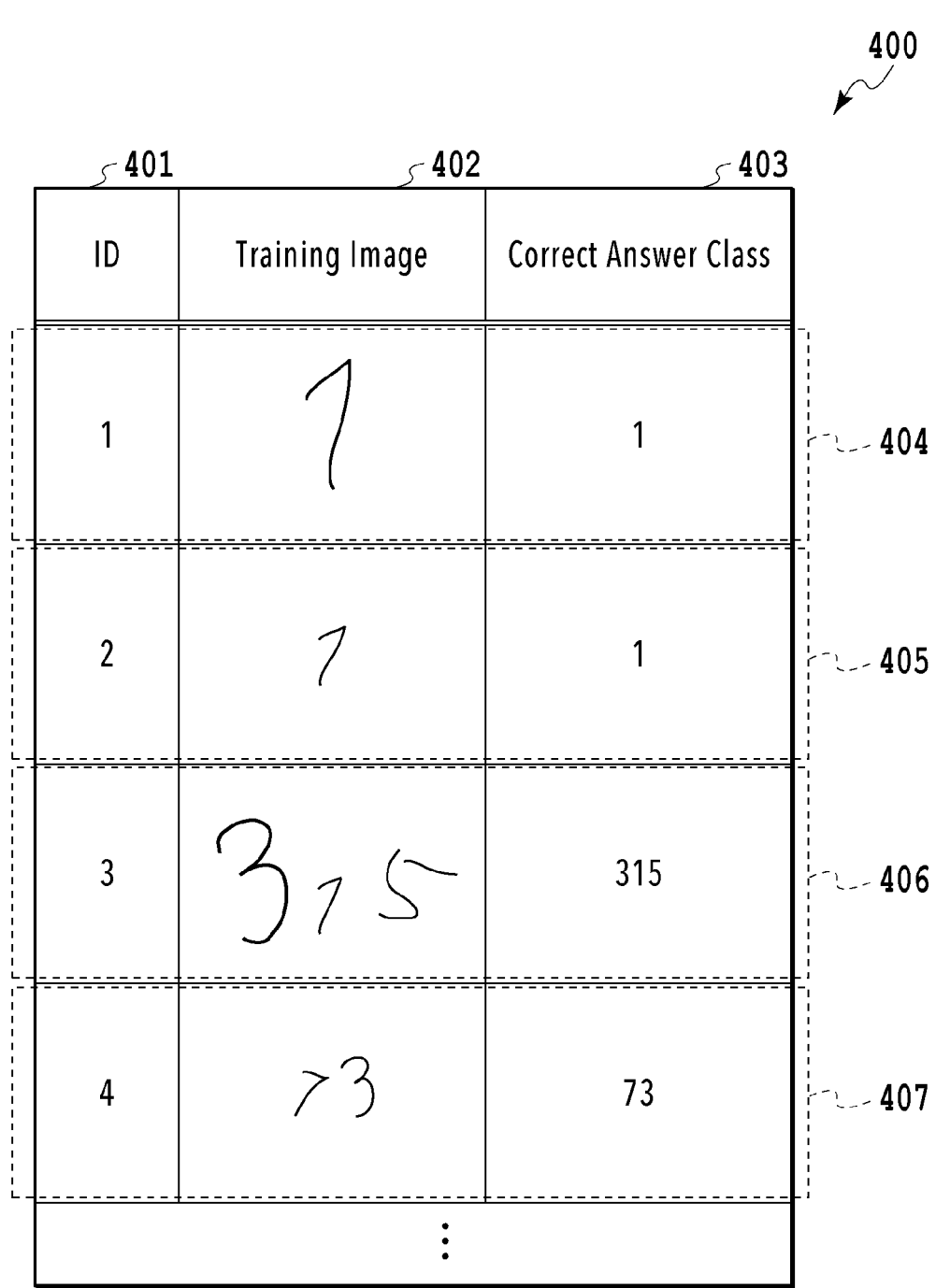
FIG. 4 is a diagram showing an example of a table as a training image DB.

Next, the training image used for training of a neural network is explained, which is generated by the training data generation unit 101 performing deformation processing for the character image stored in the character image DB described above. FIG. 4 is a diagram showing an example of a table as a database (in the following, described as "training image DB") for storing training images generated by the training data generation unit 101. In a table 400 as the training image DB, data or a value corresponding to each item of "Record ID" 401, "Training Image" 402, and "Correct Answer Class" 403 is stored. It is assumed that to the training image DB, part of the storage area of the storage 205 is allocated dedicatedly.

"Record ID" 401 is a field to which identification information for uniquely identifying each record within the table 400 is input. The value in this "Record ID" 401 is added to a record each time the record is added to the table 400. "Training Image" 402 is a field in which image data generated by modifying a character image is stored. "Correct Answer Class" 403 is a field in which a character included within the training image is stored as text data. Here, in the table 400 shown in FIG. 4, four records 404 to 407 associating the training image obtained by performing deformation processing for each character image in the records 304 to 307 in the table 300 in FIG. 3 and the correct answer class thereof each other are shown. In the specific example shown in the table in FIG. 4, the number of characters included in one training image is one to three, but it may be possible to arbitrarily set the upper limit thereof. For example, it may also be possible to adopt a configuration in which the upper limit is set to 15 characters and a training image is generated, which consists of an arbitrary number of characters, by rearranging the character images within the range thereof, or adopt a configuration in which the upper limit is set to one character and a training image is generated by only a character image including one character.

<Training Processing>

Next, the training processing by the training unit 102 is explained by using FIG. 5A. FIG. 5A is a flowchart showing a flow of the training processing. Each step shown in the flowchart in FIG. 5A is implemented by the CPU 201 loading a predetermined program stored in the ROM 202 or the like onto the RAM 204 and executing the program. The training processing is started in response to a predetermine operation of a user via the input device 206 of the image processing apparatus 100 or triggered by a predetermine input signal received from the terminal device 110 or the like via the network 120. In the present embodiment, it is assumed that for the training of a neural network, the minibatch method is used. In the following explanation, symbol "S" means a step.

At S501, from the training image DB, a dataset of the training data necessary for training is obtained. Specifically, with reference to each record included in the table 400 as the training image DB, the training data that is a pair of a training image and a correct answer class is obtained.

At S502, a neural network is initialized. Specifically, a neural network is constructed and a value of a parameter included in the neural network is determined randomly. It is possible to use a variety of structures as the neural network that is constructed. For example, it may also be possible to adopt an aspect, such as a CNN (Convolutional Neural Networks).

At S503, a predetermined number (minibatch size, for example ten. In a case where the training aspect of minibatch is not adopted, one) of pieces of training data among the training data read at S501 is obtained. Then, at S504 and S505, training of the neural network is performed.

At S504, an error of the neural network is calculated. Specifically, processing to find an error by inputting a training image that is included in each piece of training data within the minibatch obtained at S503 to the neural network, outputting class information representing a character within the training image, and evaluating a difference between the output and the correct answer class is performed. For the evaluation, it is possible to use CTC (Connectionist Temporal Classification) Loss or the like as an index.

At S505, the parameters of the neural network are adjusted. Specifically, based on the error calculated at S504, for example, processing to change the parameter of the neural network is performed by the backpropagation method.

At S506, whether or not to terminate training is determined. Specifically, whether or not the processing at S503 to S505 is performed a predetermined number of times (for example, 40,000 times) is checked. Here, it is sufficient to determine the predetermined number of times by, for example, a user inputting a desired number of times at the time of starting training processing. In a case where the processing is performed the predetermined number of times, it is determined that training is completed and the processing makes a transition to S507. In a case where the processing is not performed the predetermined number of times, the processing returns to S503 and the training of the neural network is continued.

At S507, a trained model including the parameters of the neural network, which have been adjusted at S505, is stored in the storage 205 as the training results and this processing is terminated.

The above is the contents of the training processing. In the flowchart in FIG. 5A, in the training data obtaining processing (S501), processing is performed so that the training data generated in advance is read, but it may also be possible to perform the generation processing of training data and the training processing in parallel. That is, the configuration may be one in which the training data generation processing, to be described later, is performed prior to the training data obtaining processing (S501) and the training data is obtained by sequential reading from the generated training data.

<Estimation Processing>

Next, the estimation processing by the estimation unit 103 is explained by using FIG. 5B. FIG. 5B is a flowchart showing a flow of the estimation processing according to the present embodiment. Each step shown in the flowchart in FIG. 5B is implemented by the CPU 201 loading a predetermined program stored in the ROM 202 or the like onto the RAM 204 and executing the program. The estimation processing is started in response to a predetermined operation of a user via the input device 206 of the image processing apparatus 100 or triggered by a predetermined input signal received from the terminal device 110 and the like via the network 120. In the following explanation, symbol "S" means a step.

At S511, the trained model is read. Specifically, first, a neural network having the same structure as that of the neural network constructed at S502 in the flowchart in FIG. 5A described previously is constructed and in the constructed neural network, the trained model stored at S507 described previously is reflected.

At S512, processing to generate an estimation processing-target image (in the following, called "processing-target image") is performed. This processing is generally called "block selection" and the image obtained by this is called a "character block". Details of the processing-target image generation processing will be described later.

At S513, a processing-target image of interest among the processing-target images generated at S512 is input to the trained model. Due to this, text information corresponding to the character included in the processing-target image of interest is output as estimation results.

At S514, the estimation results (character recognition results) obtained at S513 are transmitted. In the present embodiment, the estimation results are transmitted to the terminal device 110 via the network 120. It may also be possible to adopt a configuration in which the estimation results are stored in the storage 205 instead of transmitting the estimation results to the terminal device 110.

At S515, whether or not to terminate the estimation processing is determined. In a case where the estimation processing is completed for all the processing-target images generated at S512, this processing is terminated. On the other hand, in a case where an unprocessed processing-target image remains, the processing returns to S513, and the next processing-target image of interest is input to the trained model and the estimation processing is continued.

The above is the contents of the estimation processing.

<Processing-Target Image Generation Processing>

Figure 20:
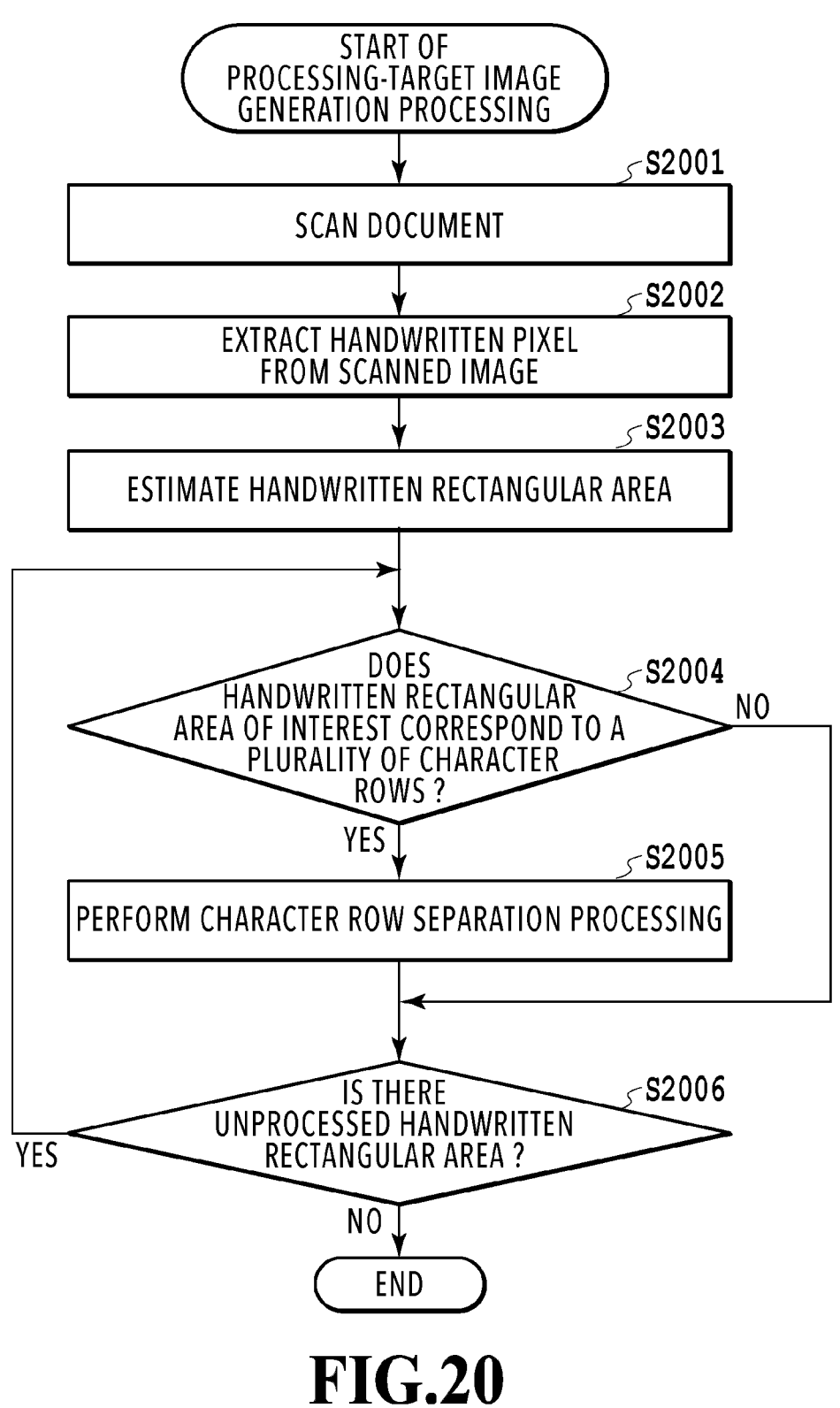
FIG. 20 is a flowchart showing a flow of processing-target image generation processing.

Next, with reference to the flowchart in FIG. 20, details of the estimation processing are explained.

At S2001, the scanner device 210 scans a document and generates a scanned image. An image 2100 shown in FIG. 21A is a specific example of a scanned image obtained by scanning a receipt to which the amount is input by handwriting. The scanned image such as this is obtained at this step.

At S2002, processing to extract a pixel (handwritten pixel) corresponding to a handwritten character from the scanned image obtained at S2001 is performed. For this extraction, it may be possible to apply a publicly known technique, for example, such as a method of determining whether or not the pixel is a handwritten pixel based on the luminance feature of each pixel constituting the scanned image. Due to this, an image (in the following, called "extracted image") in which only the areas corresponding to the handwritten characters are extracted from the scanned image is obtained. An image 2101 shown in FIG. 21B is a specific example of an extracted image obtained from the scanned image 2100 shown in FIG. 21A. The extracted image such as this is obtained at this step.

At S2003, based on the extracted image obtained at S2002, processing to specify a rectangular area (handwritten character block) representing only the handwritten character portion is performed. A specific procedure is as follows. First, binarization processing to classify each pixel of the extracted image into a black pixel and a white pixel is performed. Next, from the results of the binarization processing, a black pixel block is detected and a circumscribed rectangle is found for each black pixel block. Next, the distance between the centers of the circumscribed rectangles of each black pixel block is calculated and the pixel blocks in proximity whose distance is less than or equal to a predetermined threshold value are grouped. This is repeated until it is no longer possible to perform grouping. By the above processing, it is possible to obtain a handwritten character block. FIG. 21C is a specific example of the handwritten character block obtained from the extracted image 2101 shown in FIG. 21B and two handwritten character blocks 2102 and 2103 are obtained. Then, it is seen that the handwritten character block 2103 includes character rows corresponding to two upper and lower rows. The handwritten character block such as this is obtained at this step.

At S2004, for the handwritten character block of interest among the handwritten character blocks obtained at S2003, whether or not a plurality of character rows is included is determined. For this determination, for example, the ruled line printed within the scan-target document is used. Specifically, first, the pixel corresponding to the ruled line in the handwritten character block of interest is specified. Next, in a case where a handwritten pixel exists within an area surrounded by segments represented by the specified pixel and the areas such as those are in contact with each other, it is determined that there is a plurality of character rows. In a case where the results of the determination such as this indicate that a plurality of character rows is not included within the handwritten character block of interest, the handwritten character block of interest is determined to be a processing-target image and the processing skips S2005 and advances to S2006. On the other hand, in a case where a plurality of character rows is included, the processing advances to S2005.

At S2005, for the handwritten character block of interest, processing to separate the plurality of character rows into a rectangular area for each character row (character row separation processing) is performed. For example, by separating the plurality of character rows at the position of the segment represented by the pixel corresponding to the ruled line described above, it is possible to separate the plurality of character rows into the handwritten character block for each character row. FIG. 21D shows a specific example of the character row separation processing in which the handwritten character block 2103 described previously is separated into two handwritten character blocks 2104 and 2105. Each handwritten character block separated for each character row in this manner is determined to be a processing-target image and the processing advances to S2006.

At S2006, whether or not all the handwritten character blocks obtained at S2003 are processed is determined. In a case an unprocessed handwritten character block remains, the processing returns to S2004, and the next handwritten character block of interest is determined and the processing is continued. On the other hand, in a case where all the handwritten character blocks are processed, this processing is terminated.

The above is the contents of the processing-target image generation processing. Due to this, the handwritten character block for each character row, which represents the handwritten character portion and the other portion by two values (white pixel or black pixel), is generated as the processing-target image.

<Training Data Generation Processing>

Figure 6:
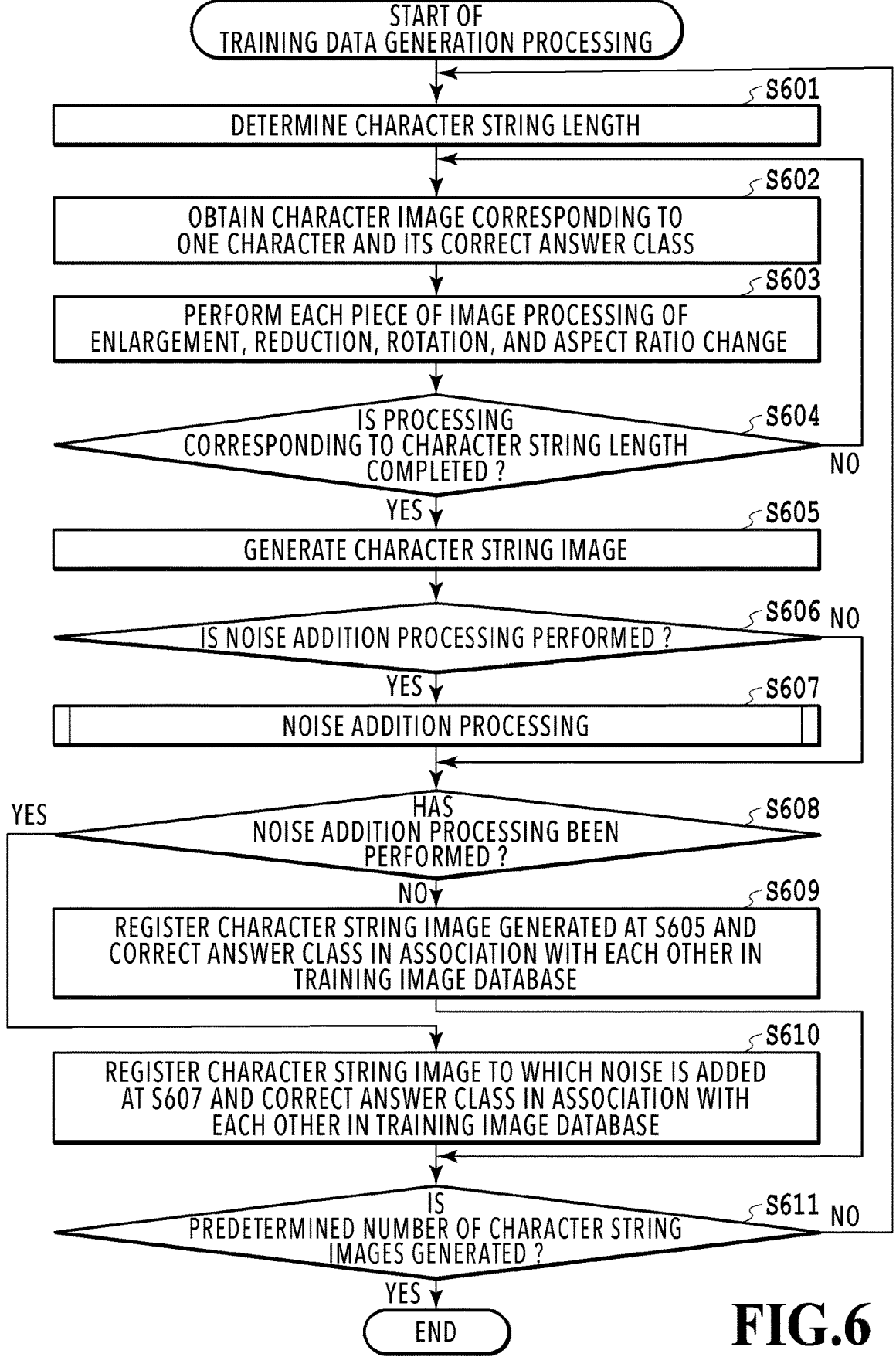
FIG. 6 is a flowchart showing a flow of training data generation processing.

Following the above, the training data generation processing by the training data generation unit 101 is explained by using FIG. 6. FIG. 6 is a flowchart showing a rough flow of the training data generation processing. Each step shown in the flowchart in FIG. 6 is implemented by the CPU 201 loading a predetermined program stored in the ROM 202 or the like onto the RAM 204 and executing the program. The training data generation processing is started in response to a predetermined user operation via the input device 206 of the image processing apparatus 100 or triggered by a predetermined input signal received from the terminal device 110 or the like via the network 120. In the following explanation, symbol "S" means a step.

At S601, the character string length in a character string image to be generated from now on (that is, how many characters to which the character image corresponds are used to generate a training image) is determined randomly. At this time, for example, the minimum character string length is "1" and for example, the maximum character string length is "15", but it is possible to set any value to both.

At S602, from a character image DB (for example, the table 300 described above), a pair of a character image corresponding to one character and its correct answer class is obtained randomly. The character image that is obtained here is a character image that has been collected physically before the deformation processing is performed. What is required is to be capable of obtaining a character image so that unevenness does not occur in training data that is generated and it may also be possible to impose some limit to an obtaining target by changing the correct answer class in order, and so on.

At S603, for the character image obtained at S602, deformation processing is performed. Specifically, enlargement/reduction or expansion/contraction processing at a scale selected randomly within a predetermined range is performed. Further, similarly, rotation processing at an angle selected randomly within a predetermined range and aspect ratio change processing at a ratio selected randomly within a predetermined range are performed.

At S604, whether or not the processing corresponding to the character string length determined at S601 is completed is determined. In a case where the processing corresponding to the determined character string length is completed, the processing advances to S605 and in a case where the processing is not completed, the processing returns to S602 and the processing is continued.

At S605, a character string image is generated, which is obtained by combining modified character images corresponding to a plurality of characters generated by the processing so far. As a specific combination method, for example, by arranging the modified character images in order of generation from left to right and linking them, a character string image is generated. Further, in the same order, the correct answer classes of the character images that are the base of the modified character images are arranged from left to right and this is taken as the correct answer class corresponding to the generated character string image. The data of the character string image and the correct answer class, which is obtained as described above, is stored in the RAM 204.

At S606, whether or not to perform noise addition processing is determined. For example, in a case where the probability of performing the noise addition processing is set to 50%, it may be possible to output "0" or "1" randomly from random numbers and determine to "perform the processing" in a case where the output value is "0" and determine "not to perform the processing" in a case where the output value is "1". The probability value of 50% described above is an example and it may be possible to set any value other than 0%. In a case where it is determined to "perform the processing", the processing advances to S607 and in a case where it is determined "not to perform the processing", the processing advances to S608.

At S607, for the character string image generated at S605, the noise addition processing is performed. Details of the noise addition processing will be described later.

At S608, the processing is branched in accordance with whether or not the noise addition processing is performed. In a case where the noise addition processing is not performed, the processing advances to S609 and in a case where the noise addition processing is performed, the processing advances to S610.

At S609, processing to take the character string image generated at S605 as the training image, associate this with the correct answer class obtained at S602, and register this as training data in the training image data DB is performed. Further, at S610, processing to take the character string image for which the noise addition processing has been performed at S607 as the training image, associate this with the correct answer class obtained at S602, and register this as training data in the training image data DB is performed. The correct answer class included in the training data that is registered at S610 is the same as the correct answer class obtained at S602, and therefore, in the training processing described previously, training is performed so as to ignore the noise.

At S611, whether or not to terminate the training data generation processing is determined. The termination condition here is, for example, a case where generation of a predetermined number of character string images is completed and the like. In a case where the termination condition is not satisfied, the processing returns to S601 and the processing is continued. In a case where the termination condition is satisfied, the training data generation processing is terminated.

The above is rough contents of the training data generation processing.

<Details of Noise Addition Processing>

Figure 7:
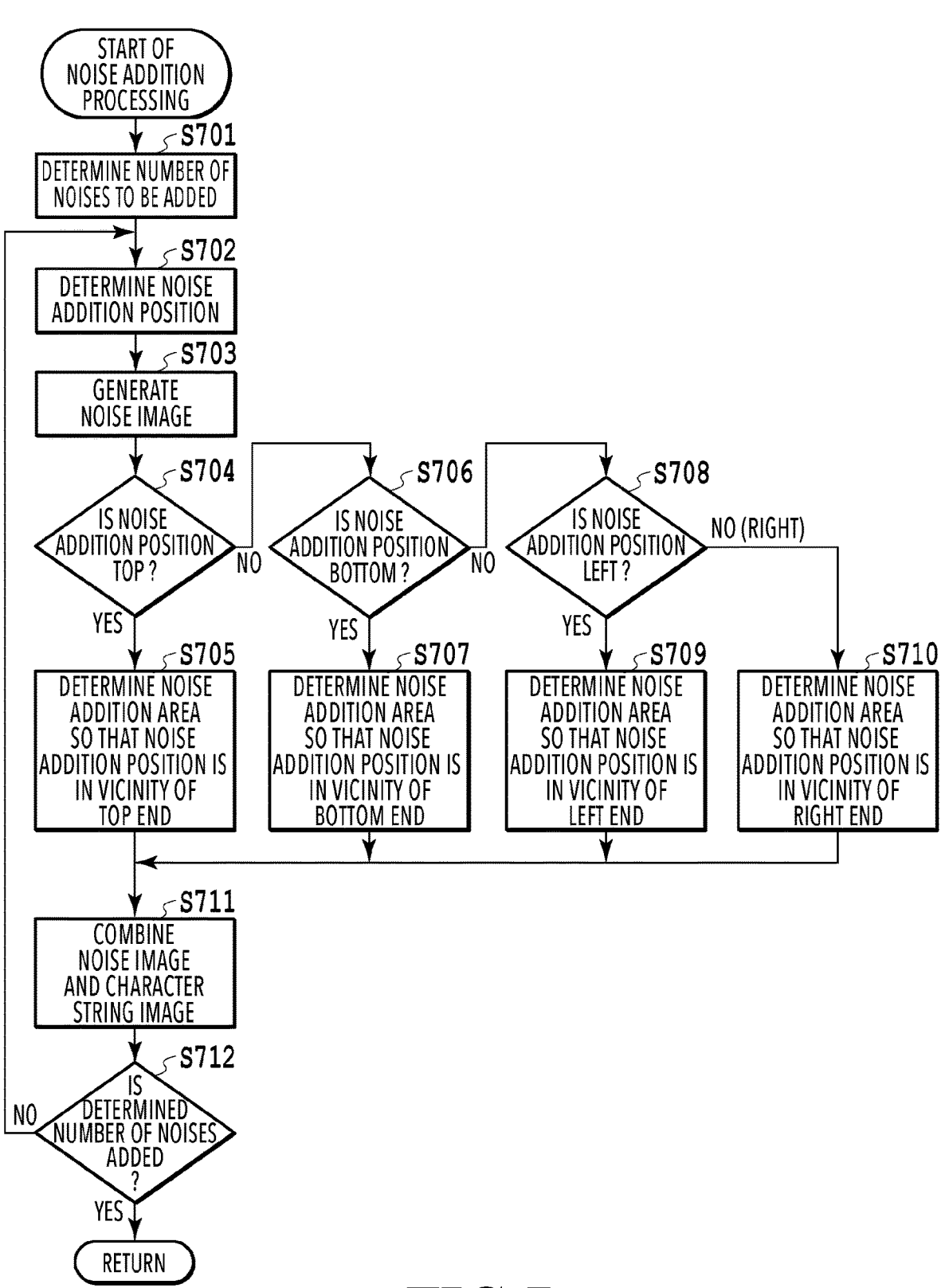
FIG. 7 is a flowchart showing details of noise addition processing according to a first embodiment.

Following the above, with reference to a flowchart in FIG. 7, the noise addition processing according to the present embodiment is explained in detail.

At S701, the number of noises that are added to one character string image is determined randomly. The range of the number is, for example, one to three, but it may be possible to set any number.

At S702, which position within the character string image the number of noises determined at S701 is added to is determined randomly. For example, in a case where the character string image is divided into four areas, that is, the top area, the bottom area, the left area, and the right area, and the probability of adding the noise to each area is taken to be 25%, a value is output randomly from random numbers in a range of 0 to 3. Then, in a case where the output value is "0, the noise addition position is determined to be "top", in a case of "1", the noise addition position is determined to be "bottom", in a case of "2", the noise addition position is determined to be "left", and in a case of "3", the noise addition position is determined to be "right". In this manner, the noise addition position is determined randomly. The probability value 25% is an example and the probability value is not limited to 25%. For example, a character is more likely to enter the top and the bottom than the left and the right, and therefore, it may also be possible to set a higher probability of adding noise at the top and the bottom positions. In a case where the number determined at S701 is two or more, it may also be possible to set the same noise addition position (for example, set all the noise addition positions to the top and the like) or it may also be possible to set different noise addition positions (for example, the top and the bottom and the like).

Figure 8:
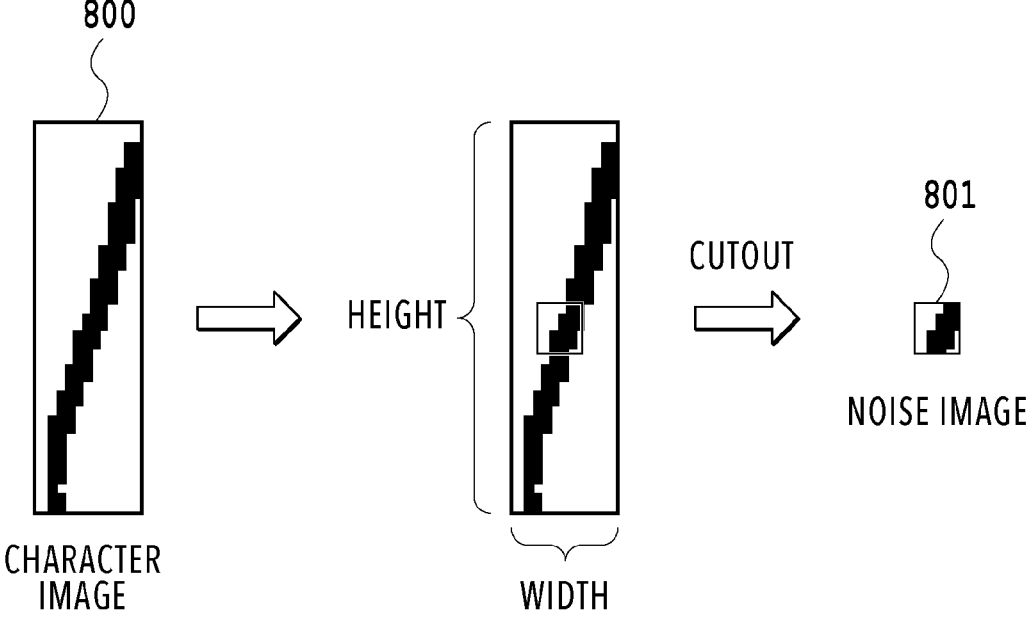
FIG. 8 is a diagram explaining generation of a noise image.

At S703, a noise image is generated. FIG. 8 is a diagram explaining the generation method of a noise image. As shown in FIG. 8, for generation of a noise image, a character image is used. The character image that is used is obtained by randomly selecting a character image stored in the character image DB. In the following, explanation is given based on a specific example shown in FIG. 8. First, an X-coordinate is determined randomly so as to be included within the width of a character image 800. Next, a Y-coordinate is determined randomly so as to be included within the height of the character image 800. Then, a character image having a predetermined width and a predetermined height in the horizontally rightward direction and in the vertically downward direction from each of the determined X-coordinate and the Y-coordinate is cut out and a noise image 801 is obtained. Here, as the predetermined width and the predetermined height, it is sufficient to determine in advance predetermined ratios (for example, 1 to 40%), respectively, in a case where the width and the height of the character image 800 are taken as references. The above-described noise image generation method is an example and, for example, it may also be possible to generate a noise image by drawing a segment and the like by image processing.

At S704, whether or not the noise addition position determined at S702 is the top is determined. In a case where the noise addition position is the top, the processing advances to S705 and in other cases, the processing advances to S706. Then, at S705, the noise addition area within the character string image is determined so that a noise that seems to be caused by part of a character in another row entering the vicinity of the top end within the character string image is reproduced.

At S706, whether or not the noise addition position determined at S702 is the bottom is determined. In a case where the noise addition position is the bottom, the processing advances to S707 and in other cases, the processing advances to S708. Then, at S707, the noise addition area within the character string image is determined so that a noise that seems to be caused by part of a character in another row entering the vicinity of the bottom end within the character string image is reproduced.

At S708, whether or not the noise addition position determined at S702 is the left is determined. In a case where the noise addition position is the left, the processing advances to S709 and in the other case, the processing advances to S710. Then, at S709, the noise addition area within the character string image is determined so that a noise that seems to be caused by part of a character in another row entering the vicinity of the left end within the character string image is reproduced. Further, at S710, the noise addition area within the character string image is determined so that a noise that seems to be caused by part of a character in another row entering the vicinity of the right end within the character string image is reproduced.

Figure 9A:
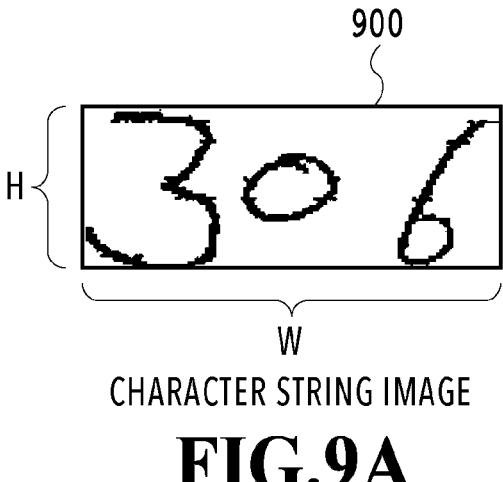
FIG. 9A is a diagram showing a character string image and FIG. 9B to FIG. 9E are each a diagram showing a specific example of a noise addition area within the character string image.
Figure 9B:
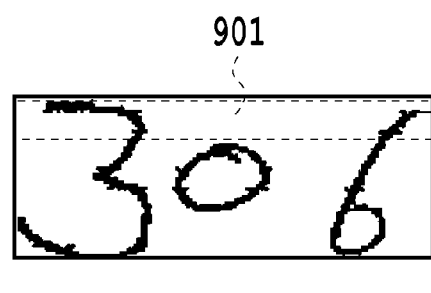
Figure 9C:
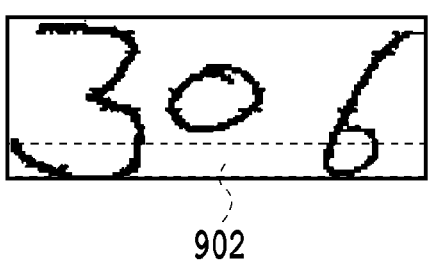
Figure 9D:
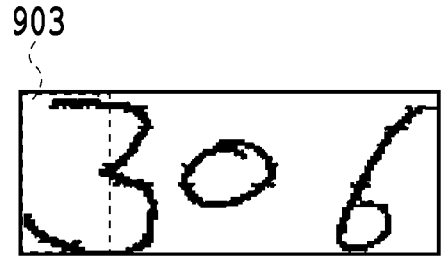
Figure 9E:
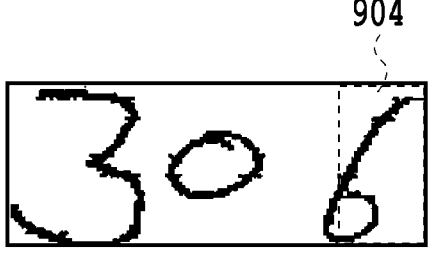

FIG. 9A is a diagram showing a character string image and FIG. 9B to FIG. 9E are each a diagram showing a specific example in which the noise addition area is determined in the vicinity of an end portion of the character string image. At S705, a noise addition area 901 as shown in FIG. 9B is determined so that the noise addition position is included in the vicinity of the top end of a character string image 900 shown in FIG. 9A. Here, in a case where the width of the character string image 900 is taken to be W, the height of the character string image 900 is taken to be H, and the ratio in which the noise addition area occupies the character string image 900 is taken to be R, the noise addition area 901 is an area whose coordinates (0, 0) are the top-left end point and whose coordinates (W−1, H*R−1) are the bottom-right end point. It is assumed that the range of the ratio R in this case is, for example, 5 to 15%. Similarly, at S707, a noise addition area 902 as shown in FIG. 9C is determined so that the noise addition position is included in the vicinity of the bottom end of the character string image 900 shown in FIG. 9A. The noise addition area 902 in this case is an area whose coordinates (0, H*(1−R)) are the top-left end point and whose coordinates (W−1, H−1) are the bottom-right end point. Similarly, at S709, a noise addition area 903 as shown in FIG. 9D is determined so that the noise addition position is included in the vicinity of the left end of the character string image 900 shown in FIG. 9A. The noise addition area 903 in this case is an area whose coordinates (0, 0) are the top-left end point and whose coordinates (W*R−1, H−1) are the bottom-right end point. Similarly, at S710, a noise addition area 904 as shown in FIG. 9E is determined so that the noise addition position is included in the vicinity of the right end of the character string image 900 shown in FIG. 9A. The noise addition area 904 in this case is an area whose coordinates (W*(1−R), 0) are the top-left end point and whose coordinates (W−1, H−1) are the bottom-right end point.

Figure 10:
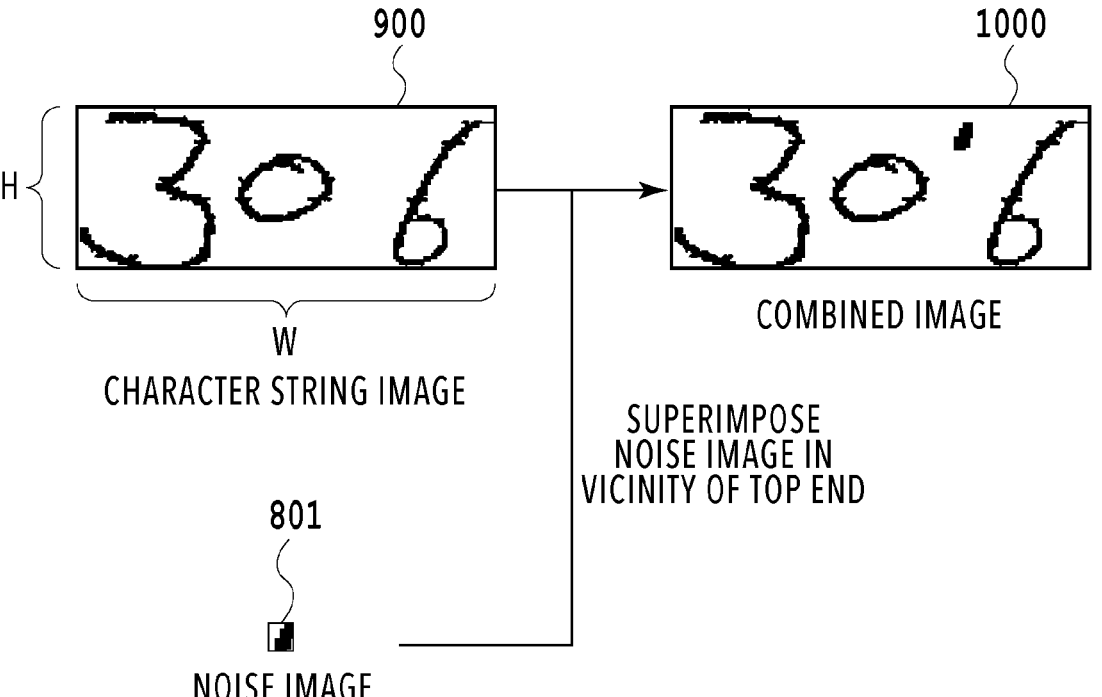
FIG. 10 is a diagram showing a specific example in which a combined image is generated by superimposing a noise image on a character string image.

At S711, processing to combine the noise image generated at S703 and the character string image by superimposing the noise image on the character string image is performed. It may be possible to randomly determine the position at which the noise image is superimposed from within the noise addition areas determined at S705, S707, S709, and S710. FIG. 10 shows a specific example. In the example in FIG. 10, by superimposing the noise image 801 shown in FIG. 8 in the vicinity of the top end of the character string image 900 shown in FIG. 9, a combined image 1000 is obtained. It may also be possible to combine the noise image in a state where the noise image does not come into contact with the end portion of the character string image as shown in FIG. 10 or to combine the noise image in a state where the noise image comes into contact with the end portion as will be illustrated in FIG. 16, to be described later. The combined image, like the combined image 1000, in which the noise image is superimposed in a state where the noise image does not come into contact with the top end of the character string image reproduces a state where the segment corresponding to part of a character in another row enters the lower character string area in a state where the segment is disconnected from the character. The combined image generated in this manner is stored in the RAM 204.

At S712, whether or not the processing to add the predetermined umber of noises determined at S701 is completed is determined. In a case where the noise addition of the predetermined number of noises is completed, this processing is terminated. On the other hand, in a case where the noise addition of the predetermined number of noises is not completed, the processing returns to S702 and the processing is continued.

The above is the contents of the noise addition processing. In a case where training is performed by using the character string image to which a noise is added and thus generated as the training image, it may also be possible to perform training by using only the training image to which a noise is added or to perform training by mixing the training image to which no noise is added with the training image to which a noise is added.

Modification Example

As described previously, in the flowchart in FIG. 20, in a case where a plurality of character rows is included in the handwritten character block, the processing-target image for each character row is generated by performing the character row separation processing. Here, there is a possibility that the processing-target image obtained by the character row separation processing is a "part-entered image" entered by part of another character row, but the possibility that the processing-target image obtained by not performing the character row separation processing is a "part-entered image" is slight. Consequently, it may also be possible to switch the trained models that are utilized at the time of estimation in accordance with whether the processing-target image is obtained by the character row separation processing.

Figure 25:
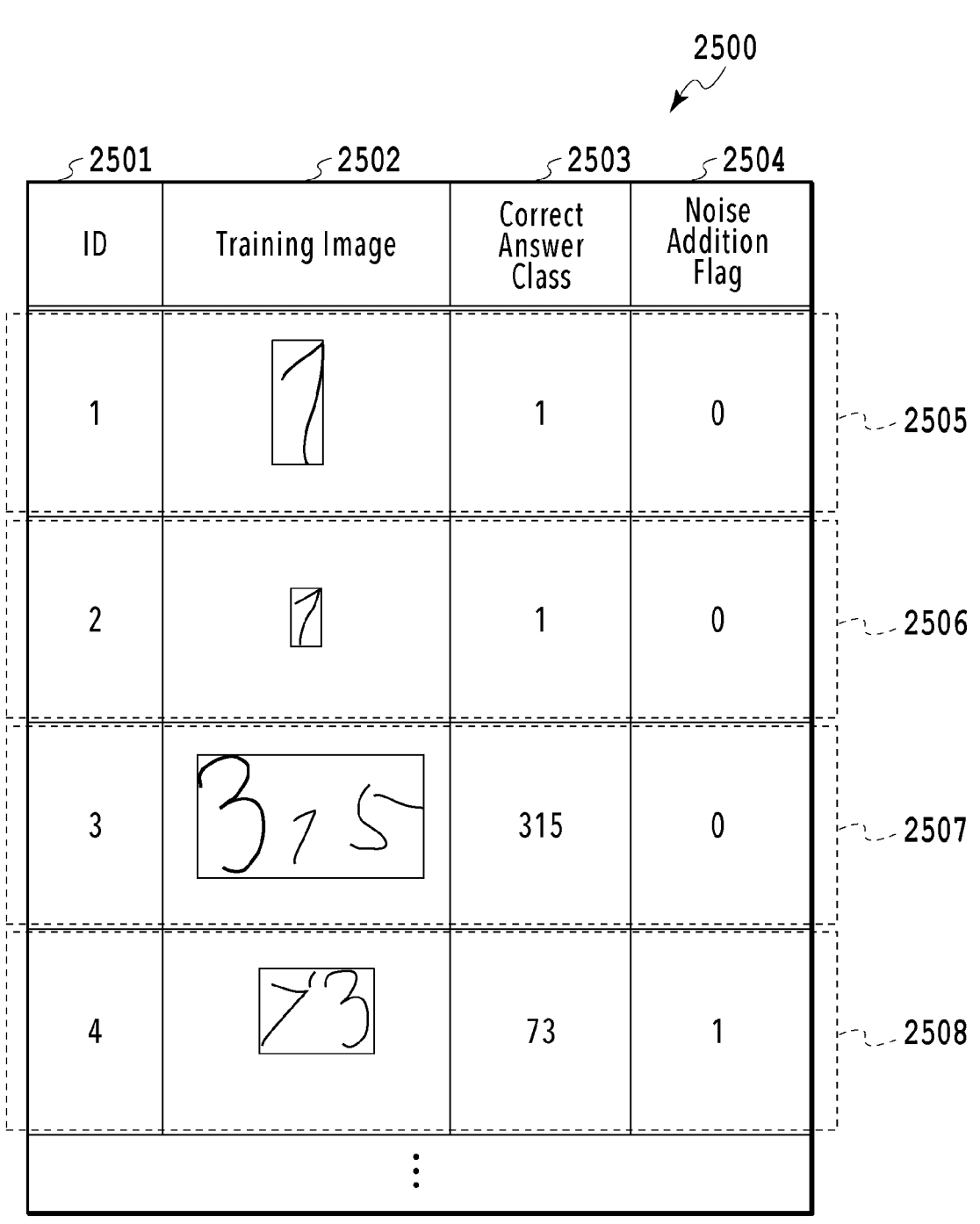
FIG. 25 is a diagram showing an example of a table as a training image DB according to the modification example of the first embodiment.

In a case of the present modification example, at the time of registering a pair of a training image and a correct answer class in the training image DB, a noise addition flag is also registered. FIG. 25 shows an example of a table as the training image DB according to the present modification example. In a table 2500 shown in FIG. 25, four items exist, that is, "Record ID" 2501, "Training Image" 2502, "Correct Answer Class" 2503, and "Noise Addition Flag" 2504. Then, to records 2505 to 2507, a flag value "0" indicating that noise addition is not performed is input and to a record 2508, a flag value "1" indicating that noise addition is performed in input.

Figure 24A:
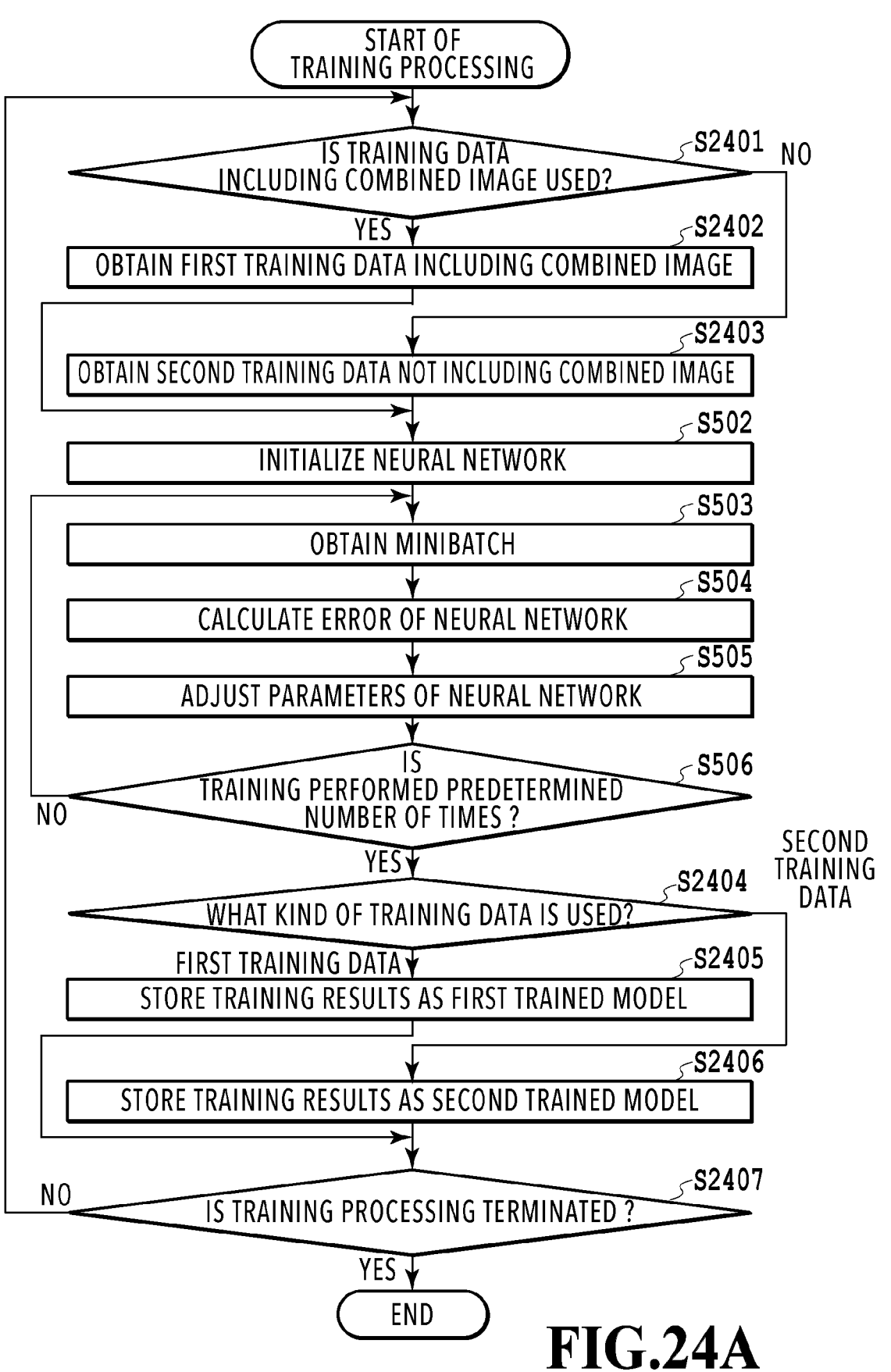
FIG. 24A is a flowchart showing a flow of training processing according to a modification example of the first embodiment and FIG. 24B is a flowchart showing a flow of estimation processing according to the modification example of the first embodiment.

Following the above, the training processing according to the present modification example is explained with reference to a flowchart in FIG. 24A. However, explanation of the contents (S502 to S506) common to those in the flowchart in FIG. 5A according to the above-described embodiment is omitted.

At S2401, the processing is branched in accordance with whether training is performed by using training data including a combined image or training is performed by using training data not including a combined image. As to which training data is used for performing training and in which case generation of training data is terminated, it is sufficient for a user to set by giving instructions and the like prior to the start of this flowchart. Here, "training data including a combined image" means training data in which a training image to which a noise is added and a training image to which no noise is added are mixed. Further, "training data not including a combined image" means training data including only the training image to which no noise is added. In a case where training is performed by using training data including a combined image, the processing advances to S2402 and in a case where training is performed by using training data not including a combined image, the processing advances to S2403.

At S2402, training data (in the following, described as "first training data") including a combined image is obtained from the training image DB. At this time, the dataset of the record whose flag value of the noise addition flag is "1" is obtained. On the other hand, at S2403, training data (in the following, described as "second training data") not including a combined image is obtained from the training image DB. At this time, the dataset of the record whose flag value of the noise addition flag is "0" is obtained.

At S2404, the processing is branched in accordance whether the training data used for training is the training data including a combined image or the training data used for training is the training data not including a combined image. In a case where training is performed by using the training data including a combined image, the processing advances to S2405 and in a case where training is performed by using the training data not including a combined image, the processing advances to S2406.

At S2405, as training results based on the training data including a combined image, a trained model (in the following, described as "first trained model") including parameters of the neural network adjusted at S505 is stored in the storage 205. Further, at S2406, as training results based on the training data not including a combined image, a trained model (in the following, described as "second trained model") including parameters of the neural network adjusted at S505 is stored in the storage 205.

At S2407, whether or not to terminate the training processing is determined. The termination condition here is, for example, whether or not both the first trained model and the second trained model are generated and the like. In a case where the termination condition is satisfied, this processing is terminated and in a case where the termination condition is not satisfied, the processing returns to S2401 and the processing is continued. The above is the contents of the training processing according to the present modification example.

Figure 24B:
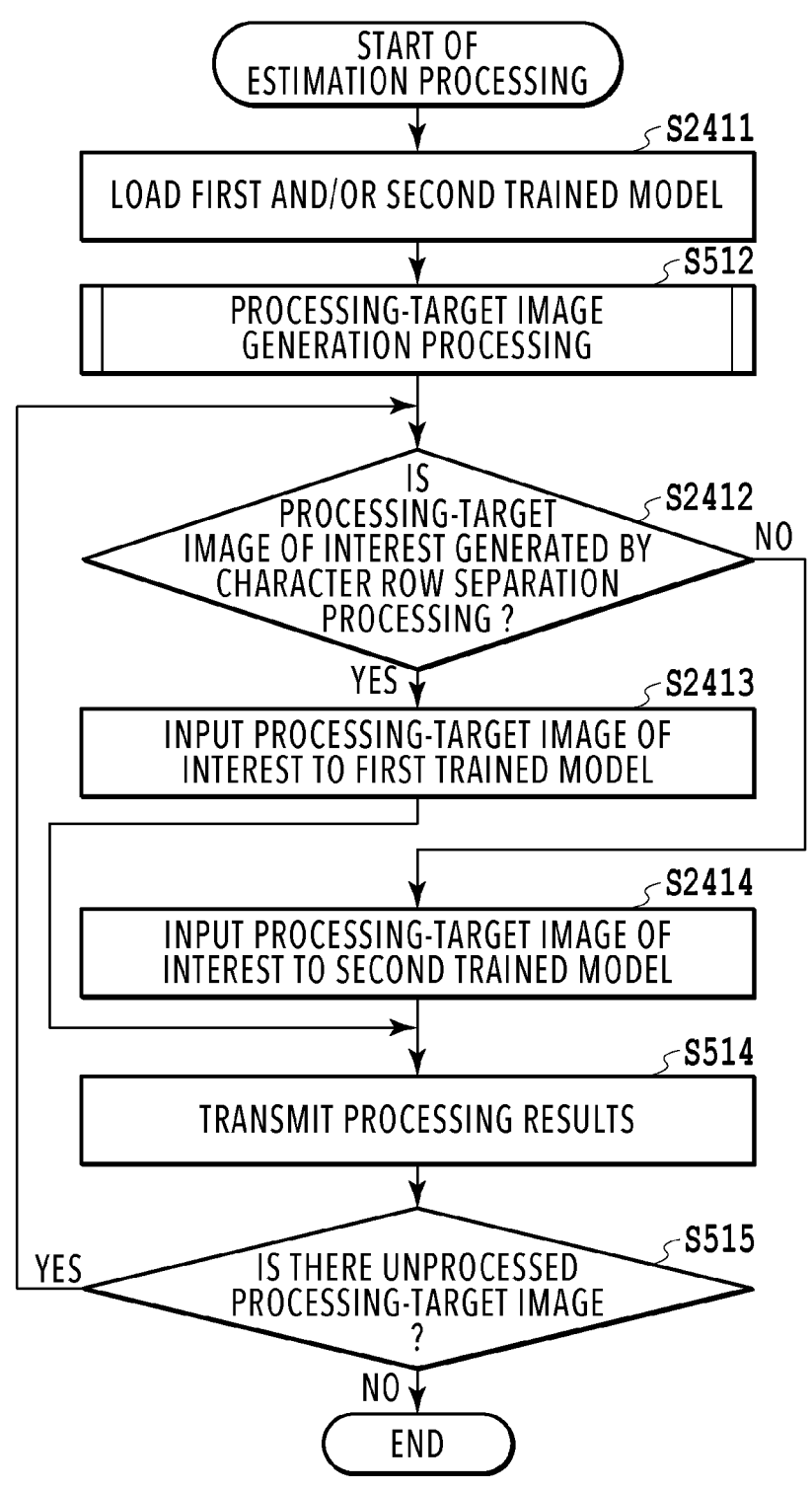

Following the above, the estimation processing according to the present modification example is explained with reference to the flowchart in FIG. 24B. However, explanation of the contents (S512, S514, S515) common to those in the flowchart in FIG. 5B according to the above-described embodiment is omitted.

At S2411, the above-described first and/or second trained model is read. Then, at S2412 that follows the processing-target image generation processing (S512), the processing is branched in accordance with whether or not the processing-target image of interest is generated by the character row separation processing. In a case where the processing-target image of interest is generated by the character row separation processing, the processing advances to S2413 and in the other case, the processing advances to S2414.

At S2413, the processing-target image of interest is input to the first trained model obtained by performing the training using training data including a combined image. Further, at S2414, the processing-target image of interest is input to the second trained model obtained by performing the training using training data not including a combined image. Due to this, text information corresponding to the character included in the processing-target image of interest is output as estimation results. The above is the contents of the estimation processing according to the present modification example.

According to the present modification example, an appropriate estimator is applied to each processing-target image, and therefore, it is made possible to reduce erroneous recognition in the handwritten character OCR.

As above, according to the present embodiment including the above-described modification example, it is possible to efficiently generate a training image that reproduces entering of a character. Then, by performing training using the training image generated by the present embodiment, it is possible to reduce erroneous recognition in the handwritten character OCR even in a case where part or the like of a character described in another entry item within a business form enters the character string image.

Second Embodiment

In the first embodiment, the noise image is generated by cutting out the noise image from a random position within the character image. Next, an aspect is explained as a second embodiment in which the cutout position from the character image is determined in accordance with the noise addition position. Explanation of the contents common to those of the first embodiment, such as the basic configuration of the system, is omitted and in the following, noise addition processing, which is a different point, is explained.

Outline of the Present Embodiment

In the noise addition processing according to the present embodiment, in a case where the noise addition position is the top, it is preferable to add a noise that simulates a case where part of another handwritten character string located above the handwritten character OCR-target character string image enters the character string image from above. Consequently, the noise image that is superimposed is cut out from the bottom end of the character image. Similarly, in a case where the noise addition position is the bottom, the noise image is cut out from the top end of the character image, in a case where the noise addition position is the left, the noise image is cut out from the right end of the character image, and in a case where the noise addition position is the right, the noise image is cut out from the left end of the character image, respectively.

<Noise Addition Processing>

Figure 11A:
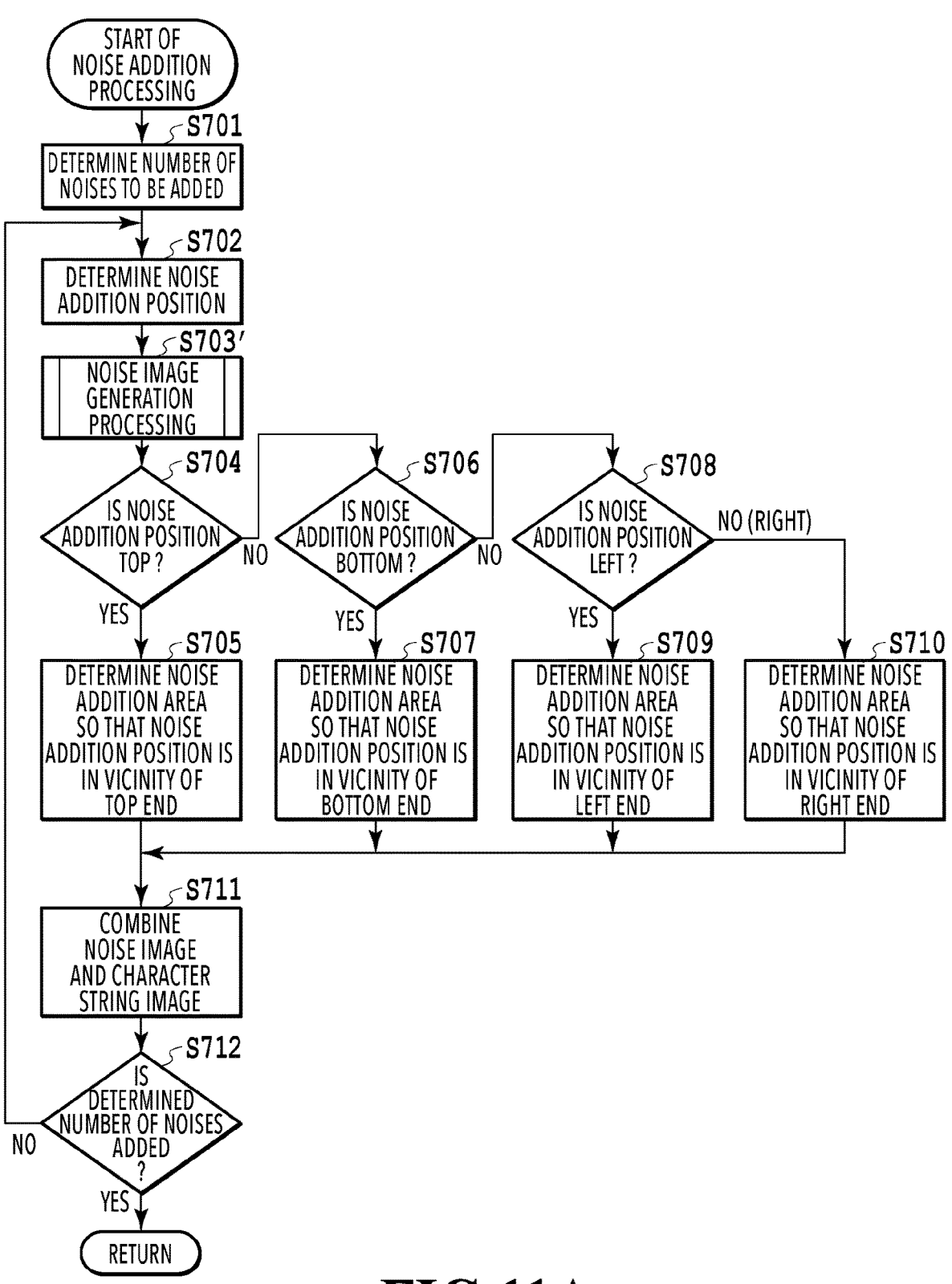
FIG. 11A is flowchart showing details of noise addition processing and FIG. 11B a flowchart showing details of noise image generation processing, according to a second embodiment.
Figure 11B:
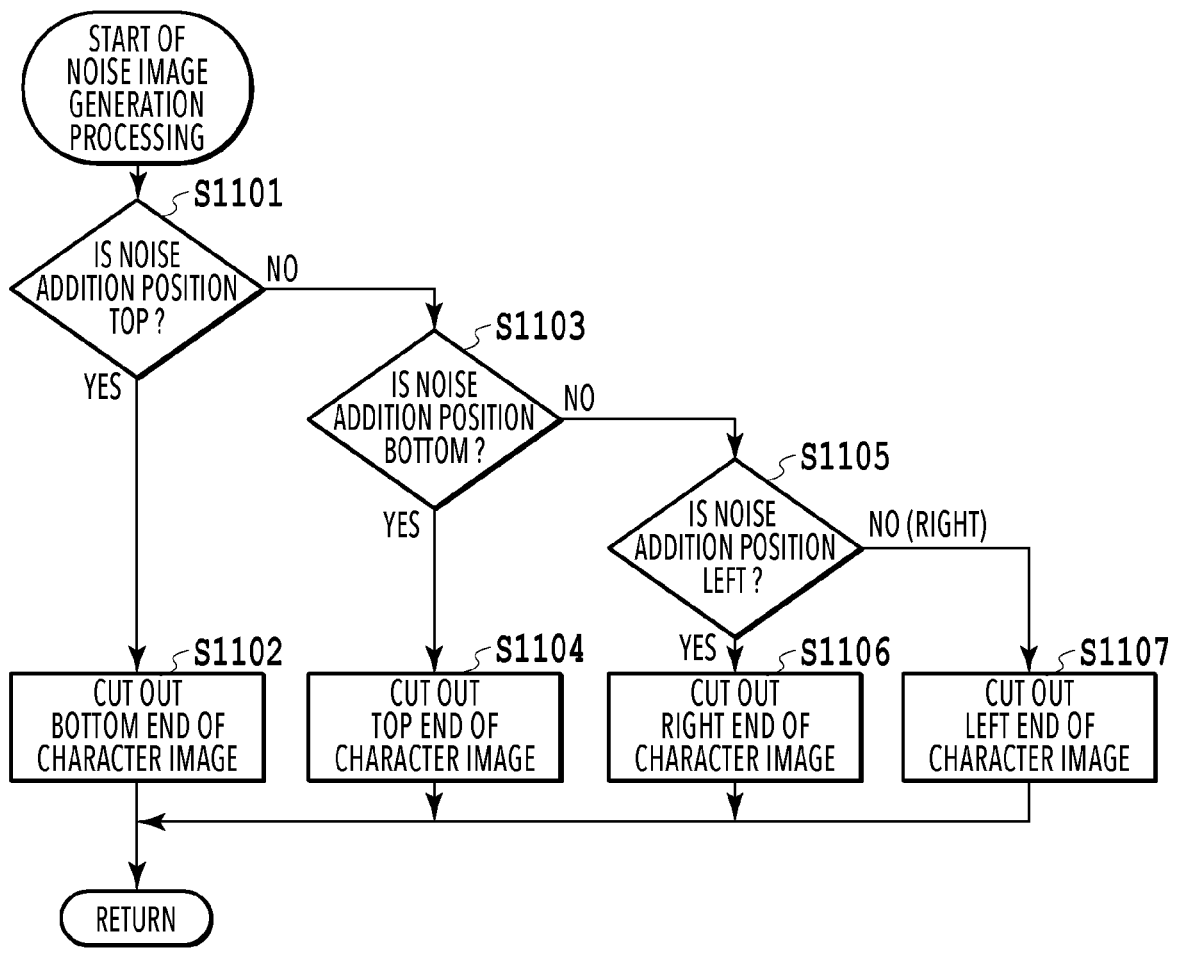

FIG. 11A is a flowchart showing details of the noise addition processing according to the present embodiment. The difference from the flowchart in FIG. 7 according to the first embodiment is only noise image generation processing at S703'. The steps (S701, S702, S704 to S712) whose reference symbol is the same other than S703' are the same and there is no difference in particular, and therefore, explanation is omitted. FIG. 11B is a flowchart showing details of the noise image generation processing according to the present embodiment. In the following, explanation is given along the flow in FIG. 11B.

At S1101, whether or not the noise addition position determined at S702 is the top is determined. In a case where the noise addition position is the top, the processing advances to S1102 and in other cases, the processing advances to S1103. Then, at S1102, the noise image is generated by cutting out the bottom end of the character image.

At S1103, whether or not the noise addition position determined at S702 is the bottom is determined. In a case where the noise addition position is the bottom, the processing advances to S1104 and in other cases, the processing advances to S1105. Then, at S1104, the noise image is generated by cutting out the top end of the character image.

At S1105, whether or not the noise addition position determined at S702 is the left is determined. In a case where the noise addition position is the left, the processing advances to S1106 and in the other case, the processing advances to S1107. Then, at S1106, the noise image is generated by cutting out the right end of the character image. Further, at S1107, the noise image is generated by cutting out the left end of the character image.

Figure 12A:
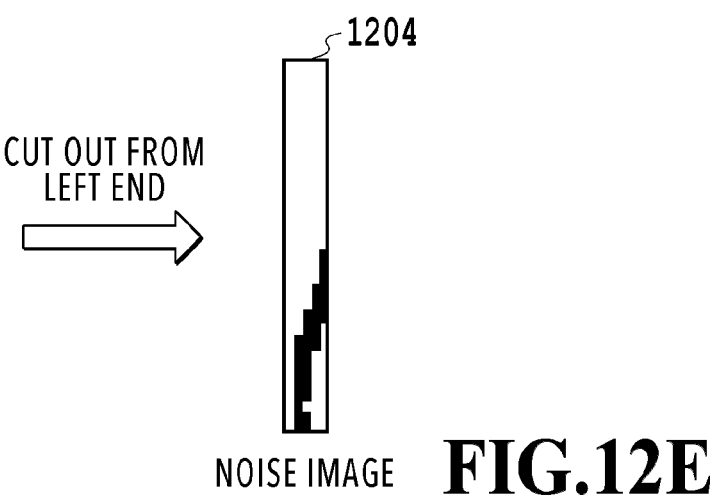

FIG. 12A is a diagram showing a character image and FIG. 12B to FIG. 12E are each a diagram showing a specific example of the noise image generation according to the present embodiment. A character image 1200 shown in FIG. 12A is a character image selected randomly from the character image DB, like the character image 800 in FIG. 8. In a case where the noise image is cut out from the bottom end or the top end, first, a predetermined length in a case where the height of the character image 1200 is taken as a reference is determined. Next, the image area corresponding to the determined length is cut out from the bottom end or the top end of the character image 1200. Due to this, a noise image 1201 that is cut out from the bottom end, which is shown in FIG. 12B, or a noise image 1202 that is cut out from the top end, which is shown in FIG. 12C, is obtained. Here, as the predetermined length, it is sufficient to determine in advance a predetermined ratio (for example, 1 to 40%) in a case where the height of the character image 1200 is taken as a reference. Similarly, in a case where the noise image is cut out from the left end or the right end, first, a predetermined length in a case where the width of the character image 1200 is taken as a reference is determined. Next, the image area corresponding to the determined length is cut out from the left end or the right end of the character image 1200. Due to this, a noise image 1203 that is cut out from the right end, which is shown in FIG. 12D, or a noise image 1204 that is cut out from the left end, which is shown in FIG. 12E, is obtained. Here, as the predetermined length, it is sufficient to determine in advance a predetermined ratio (for example, 1 to 40%) in a case where the width of the character image 1200 is taken as a reference.

The above is the contents of the noise image generation processing according to the present embodiment.

As above, according to the present embodiment, the noise image is generated, which more appropriately reproduces the aspect of entering of a character that may occur actually, and therefore, it is made possible to obtain a trained model of a higher accuracy.

Third Embodiment

In the first embodiment, the noise addition area (coordinates within the character string image) based on the noise addition position is determined randomly and the combined image is generated by superimposing the noise image on the character string image. Next, an aspect is explained as a third embodiment in which processing to extend the frame is performed for the character string image before a noise is added and the noise image is added so that the noise image comes into contact with the end portion of the character string image. Explanation of the contents common to those of the first embodiment, such as the basic configuration of the system, is omitted and in the following, noise addition processing, which is a different point, is explained.

<Noise Addition Processing>

Figure 13:
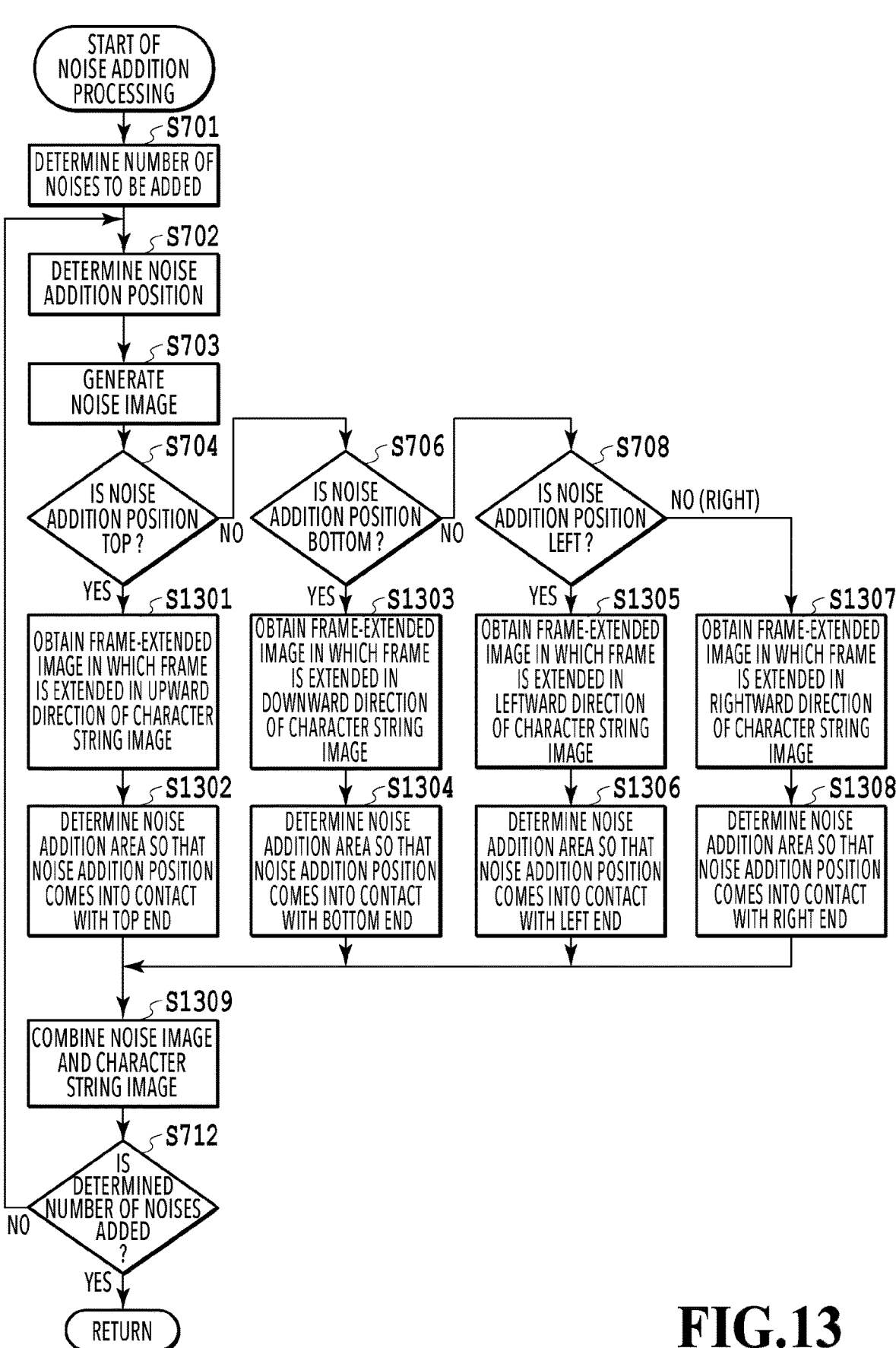
FIG. 13 is a flowchart showing details of noise addition processing according to a third embodiment.

FIG. 13 is a flowchart showing details of the noise addition processing according to the present embodiment. The difference from the flowchart in FIG. 7 according to the first embodiment is S1301 to S1309 and the steps (S701 to S708, S712) whose reference symbol is the same other than S1301 to S1309 are the same and there is no difference in particular, and therefore, explanation is omitted. In the following, explanation is given along the flow in FIG. 13.

At S1301 in a case where the noise addition position is determined to be the top (YES at S704), the processing to extend the frame in the upward direction of the character string image is performed.

At S1303 in a case where the noise addition position is determined to be the bottom (YES at S706), the processing to extend the frame in the downward direction of the character string image is performed.

At S1305 in a case where the noise addition position is determined to be the left (YES at S708), the processing to extend the frame in the leftward direction of the character string image is performed.

At S1307 in a case where the noise addition position is determined to be the right (NO at S702, S708), the processing to extend the frame in the rightward direction of the character string image is performed.

Figures 14A, 14B, 14C, 14D, 14E:
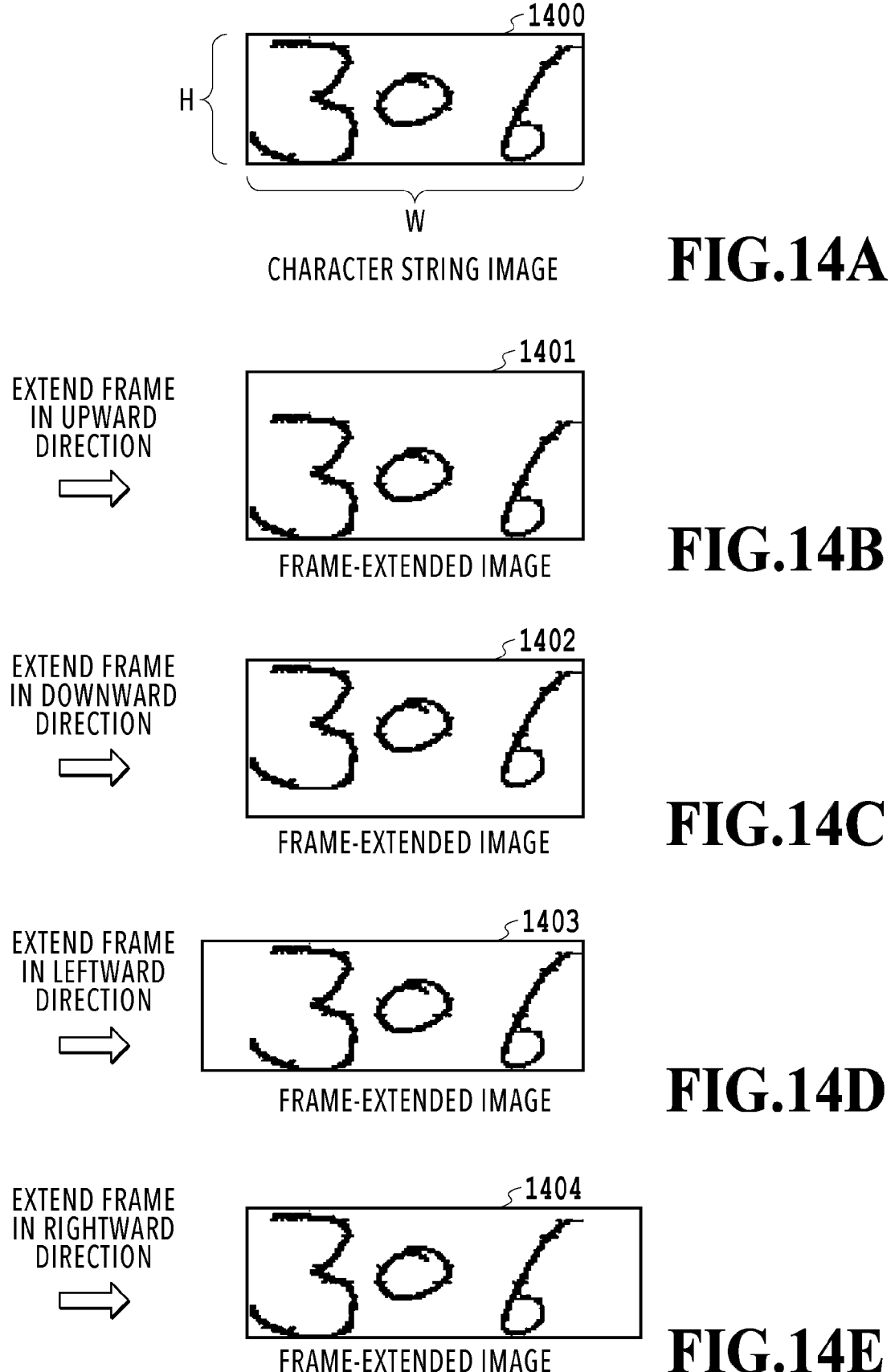
FIG. 14A is a diagram showing a character string image and FIG. 14B to FIG. 14E are each a diagram showing a specific example in which a frame-extended image is generated by extending the frame of the character string image.

FIG. 14A is a diagram showing a character string image and FIG. 14B to FIG. 14E are each a diagram showing a specific example of the image (frame-extended image) that is generated by the processing to extend the frame in each of the above-described directions.

In a case where the frame is extended in the upward direction, first, a predetermined length in a case where the height of a character string image 1400 is taken as a reference is determined. Next, the margin corresponding to the determined length is added in the upward direction of the character string image 1400. Due to this, a frame-extended image 1401 shown in FIG. 14B is obtained.

In a case where the frame is extended in the downward direction also, similarly, first, a predetermined length in a case where the height of the character string image 1400 is taken as a reference is determined. Next, the margin corresponding to the determined length is added in the downward direction of the character string image 1400. Due to this, a frame-extended image 1402 shown in FIG. 14C is obtained.

In a case where the frame is extended in the leftward direction also, similarly, first, a predetermined length in a case where the height of the character string image 1400 is taken as a reference is determined. Next, the margin corresponding to the determined length is added in the leftward direction of the character string image 1400. Due to this, a frame-extended image 1403 shown in FIG. 14D is obtained.

In a case where the frame is extended in the rightward direction also, similarly, first, a predetermined length in a case where the height of the character string image 1400 is taken as a reference is determined. Next, the margin corresponding to the determined length is added in the rightward direction of the character string image 1400. Due to this, a frame-extended image 1404 shown in FIG. 14E is obtained.

Here, the pixel in the margin portion represents white and it is sufficient to take the pixel value as "255" in a case of grayscale or the pixel values (255, 255, 255) in a case of three channels of RGB. Alternatively, for example, it may also be possible to cut out part of an image obtained by scanning white paper and paste the part as the margin portion. Further, as the predetermined length, it is sufficient to determine in advance a predetermined ratio (for example, 1 to 25%) in a case where the height of the character image 1200 is taken as a reference. As above, in each piece of the processing at S1301, S1303, S1305, and S1307, a frame-extended image in which the frame of the character string image is extended in a predetermined direction is obtained.

Following the above, at S1302 in a case where the noise addition position is determined to be the top (YES at S704), the noise addition area is determined so that the noise addition position comes into contact with the top end of the frame-extended image.

Further, at S1304 in a case where the noise addition position is determined to be the bottom (YES at S706), the noise addition area is determined so that the noise addition position comes into contact with the bottom end of the frame-extended image.

Further, at S1306 in a case where the noise addition position is determined to be the left (YES at S708), the noise addition area is determined so that the noise addition position comes into contact with the left end of the frame-extended image.

Further, at S1308 in a case where the noise addition position is determined to be the right (NO at S708), the noise addition area is determined so that the noise addition position comes into contact with the right end of the frame-extended image.

FIG. 15A to FIG. 15H are diagrams showing specific examples of determination of the noise addition area according to the present embodiment and FIG. 15I is a diagram showing a noise image.

At S1302 in a case where the frame is extended in the upward direction, a noise addition area 1501 as indicated by a broken line in FIG. 15B is determined so that the noise addition area 1501 comes into contact with the top end of the frame-extended image 1401 shown in FIG. 15A. Here, in a case where the width of the frame-extended image 1401 is taken to be W and the height of the frame-extended image 1401 is taken to be H, the noise addition area 1501 is an area whose coordinates (0, 0) are the top-left end point and whose coordinates (W, 0) are the bottom-right end point.

At S1304 in a case where the frame is extended in the downward direction, a noise addition area 1502 as indicated by a broken line in FIG. 15D is determined so that the noise addition area 1502 comes into contact with the bottom end of the frame-extended image 1402 shown in FIG. 15C. In a case where the width of the frame-extended image 1402 is taken to be W, the height of the frame-extended image 1402 is taken to be H, the width of a noise image 1500 shown in FIG. 15I is taken to be w, and the height is taken to be h, this noise addition area 1502 is an area whose coordinates (0, H−h−1) are the top-left end point and whose coordinates (W, H−h−1) are the bottom-right end point.

At S1306 in a case where the frame is extended in the leftward direction, a noise addition area 1503 as indicated by a broken line in FIG. 15F is determined so that the noise addition area 1503 comes into contact with the left end of the frame-extended image 1403 shown in FIG. 15E. Here, in a case where the width of the frame-extended image 1403 is taken to be W and the height of the frame-extended image 1403 is taken to be H, the noise addition area 1503 is an area whose coordinates (0, 0) are the top-left end point and whose coordinates (0, H) are the bottom-right end point.

At S1308 in a case where the frame is extended in the rightward direction, a noise addition area 1504 as indicated by a broken line in FIG. 15H is determined so that the noise addition area 1504 comes into contact with the right end of the frame-extended image 1404 shown in FIG. 15G. In a case where the width of the frame-extended image 1404 is taken to be W, the height of the frame-extended image 1404 is taken to be H, the width of the noise image 1500 shown in FIG. 15I is taken to be w, and the height is taken to be h, the noise addition area 1504 is an area whose coordinates (W−w−1, 0) are the top-left end point and whose coordinates (W−w−1, H) are the bottom-right end point.

Figure 16:
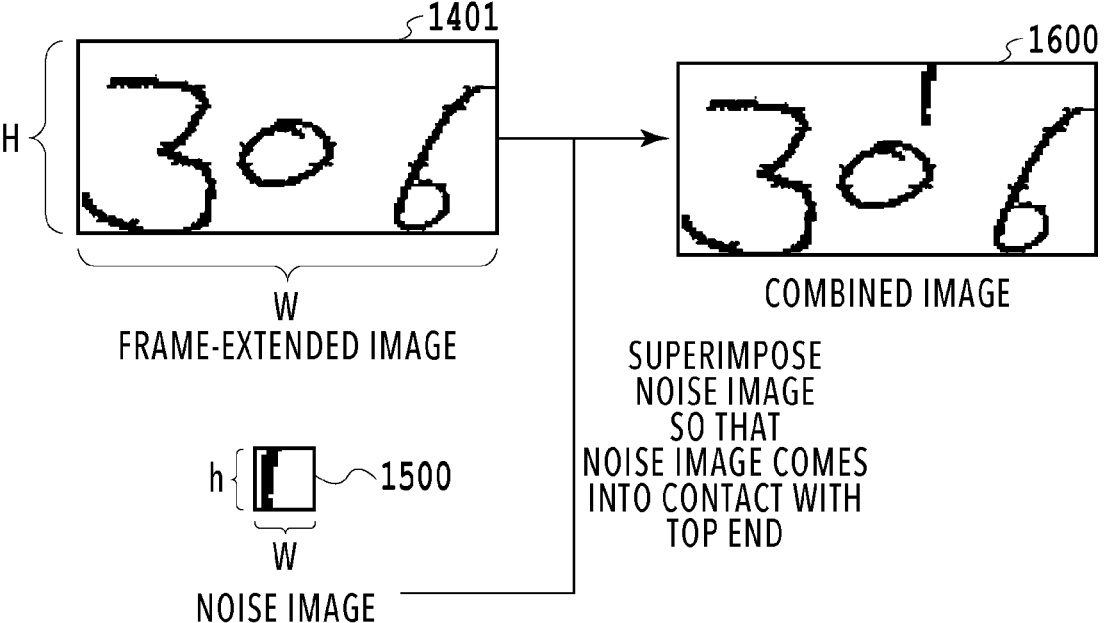
FIG. 16 is a diagram showing a specific example in which a combined image is generated by superimposing a frame-extended image and a noise image.
Figure 17:
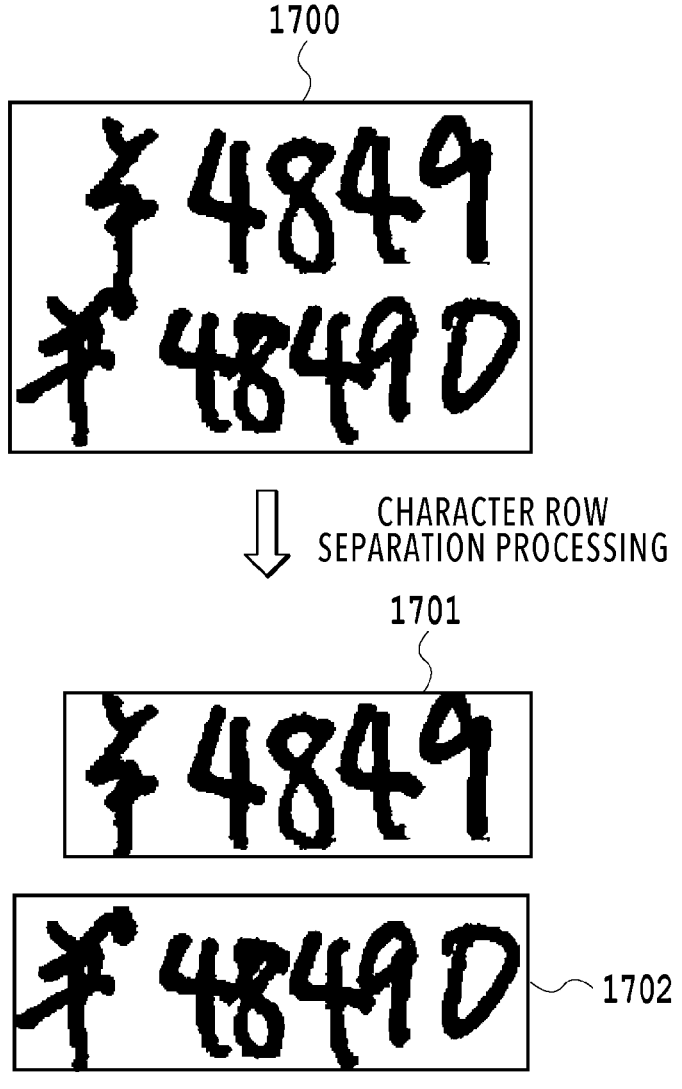
FIG. 17 is a diagram showing a specific example of a part-entered image.

At S1309, the processing to combine both the noise image generated at S703 and the frame-extended image generated at S1301, S1303. S1305, and S1307 by superimposing the noise image on the frame-extended image is performed. It is sufficient to randomly determine the position at which the noise image is superimposed from within the noise addition area determined at S1302, S1304, S1306, and S1308. FIG. 16 is an example of a case where the noise image 1500 shown in FIG. 15I is combined by superimposition so that the noise image 1500 comes into contact with the top end of the frame-extended image 1401 shown in FIG. 14B and due to this, a combined image 1600 is obtained.

The above is the contents of the noise addition processing according to the present embodiment. At S703, it may also be possible to generate a noise image by the method explained in the flowchart in FIG. 11B explained in the second embodiment. Further, as explained in the first embodiment, it may also be possible to combine the noise image in a state where the noise image does not come into contact with the end portion of the frame-extended image as shown in FIG. 10.

As above, according to the present embodiment, the noise image is generated, which more appropriately reproduces the aspect of entering of a character that may occur actually, and therefore, it is made possible to obtain a trained model of a higher accuracy.

Fourth Embodiment

There is a case where processing to remove an isolated point noise is performed for a processing-target image before being input to a trained model in the estimation processing. Due to this, the portion (pixel constituting an isolated point noise) that is not in contact with a pixel (character pixel) corresponding to a character among pixels (noise pixels) corresponding to the noises within the processing-target image is removed. That is, the noise pixel that is not in contact with the character pixel is removed and the noise pixel in contact with the character pixel remains without being removed. As a result of that, in a case where the isolated point noise removal processing is performed as the preprocessing of OCR, the processing-target image that may be input to a trained model is one of an image with no noise and an image in which a character pixel and a noise pixel are in contact. Here, as the combined image as the training image that is generated in the first to third embodiments, a type of combined image in which the character pixel and the noise pixel are not in contact is also included. That is, the type of combined image that may not be the processing-target image in a case where the isolated point noise removal processing is performed as the preprocessing of OCR is also generated as the training image. Consequently, an aspect is explained as a fourth embodiment in which only the type of combined image in which the noise pixel and the character pixel are in contact is generated in the noise addition processing. Explanation of the contents common to those of the first embodiment, such as the basic configuration of the system, is omitted and in the following, estimation processing and noise addition processing, which are different points, are explained.

<Estimation Processing>

Figure 22:
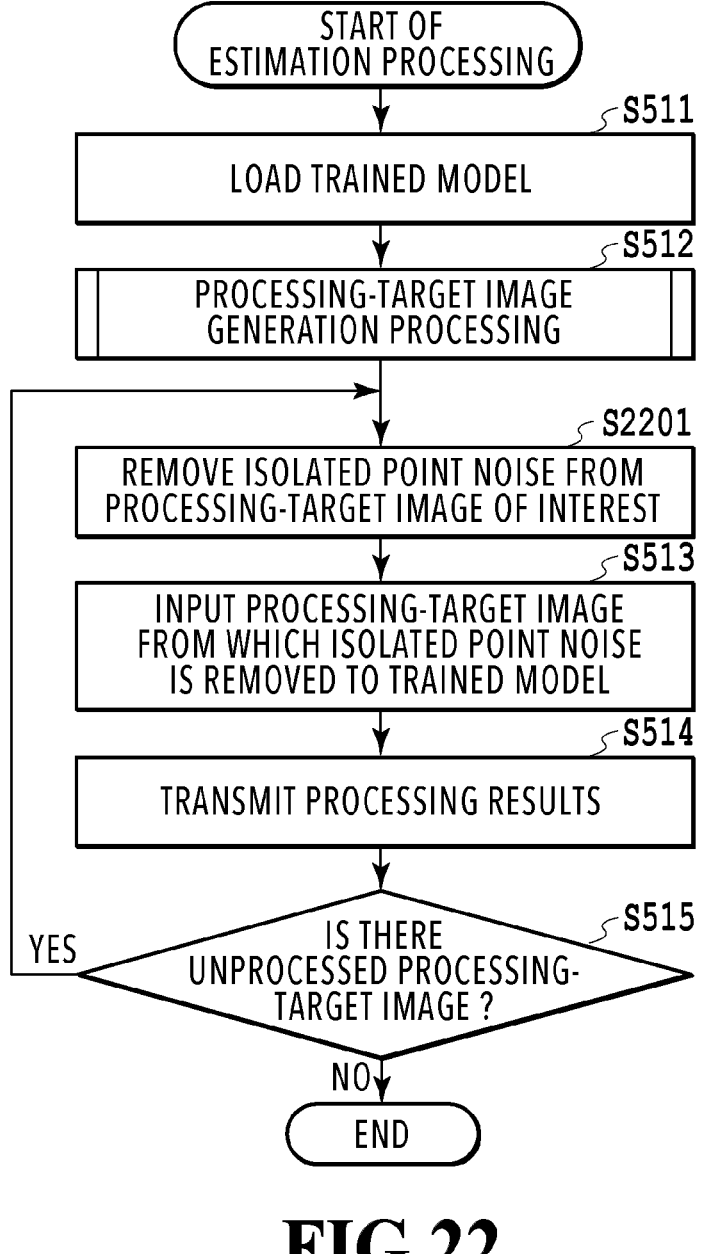
FIG. 22 is a flowchart showing a flow of estimation processing according to a fourth embodiment 4.

FIG. 22 is a flowchart showing a flow of the estimation processing according to the present embodiment. The difference from the flowchart in FIG. 5B according to the first embodiment is S2201 and the steps (S511, S512, S513 to S515) whose reference symbol is the same other than S2201 are the same and there is no difference in particular, and therefore, explanation is omitted. In the following, explanation is given along the flow in FIG. 22.

At S2201, processing to remove an isolated point noise is performed for the processing-target image of interest among the processing-target images generated at S512. As described previously, the processing-target image is a handwritten character block for each character row in which the handwritten character portion and the other portion are represented by two values of white and black. Consequently, by converting a small size black pixel block whose area (number of pixels) is less than or equal to a predetermined threshold value among the black pixel blocks within the processing-target image of interest into a white pixel block, it is possible to remove the isolated point noise. FIG. 23 is a diagram showing a specific example of the isolated point noise removal processing. Here, within a processing-target image 2300, an isolated point noise 2301 exists. By the isolated point noise removal processing, a new processing-target image 2302 from which the isolated point noise 2301 has been removed is obtained. The above-described method of removing an isolated point is an example and the method is not limited to this.

The above is the contents of the processing-target image generation processing according to the present embodiment.

<Noise Addition Processing>

Figure 18:
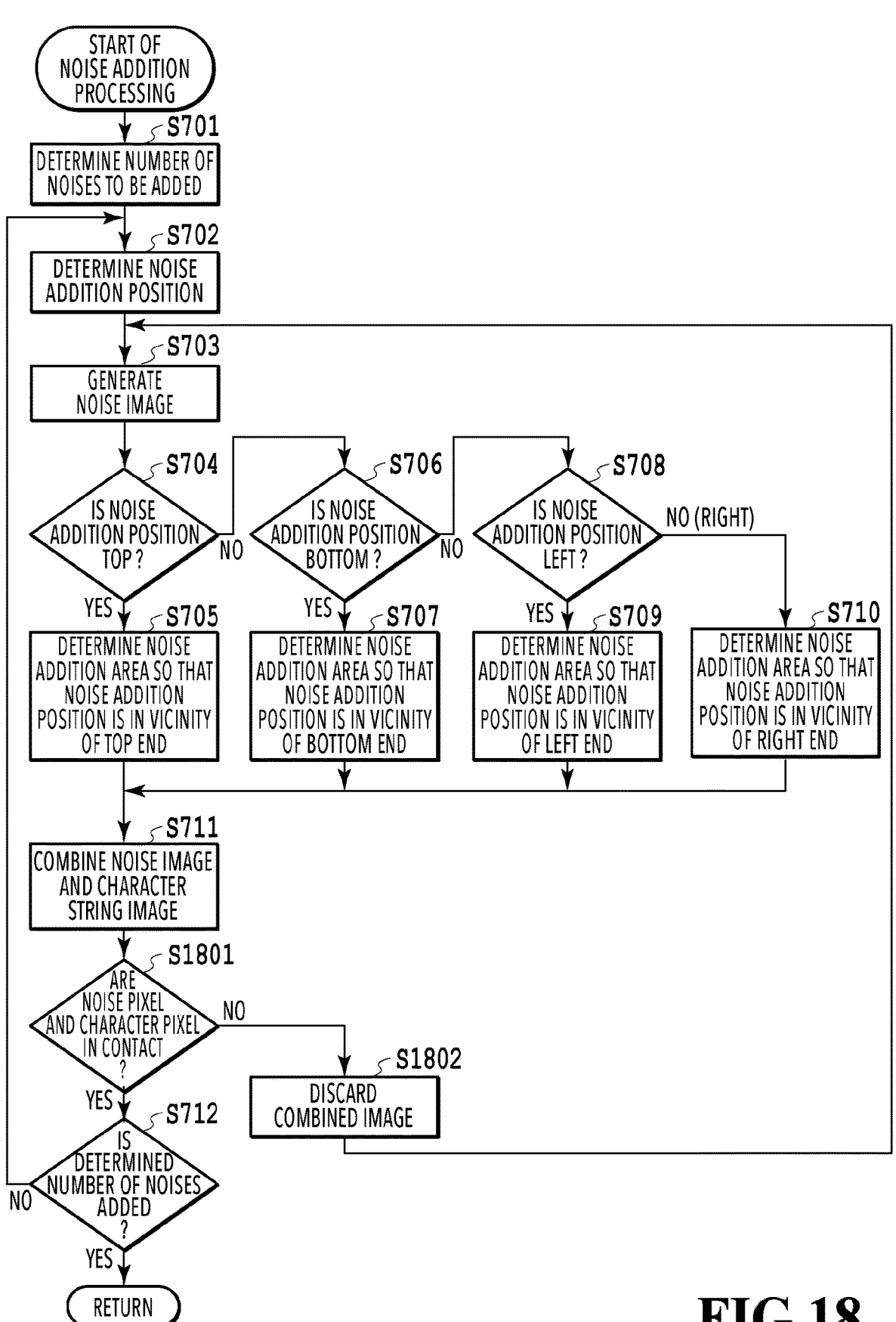
FIG. 18 is a flowchart showing details of noise addition processing according to the third embodiment.

FIG. 18 is a flowchart showing details of the noise addition processing according to the present embodiment. The difference from the flowchart in FIG. 7 according to the first embodiment is that S1801 and S1802 are added. The steps (S701 to S712) whose reference symbol is the same other than S1801 and S1802 are the same and there is no difference in particular, and therefore, explanation is omitted. In the following, explanation is given along the flow in FIG. 18.

Figure 19:
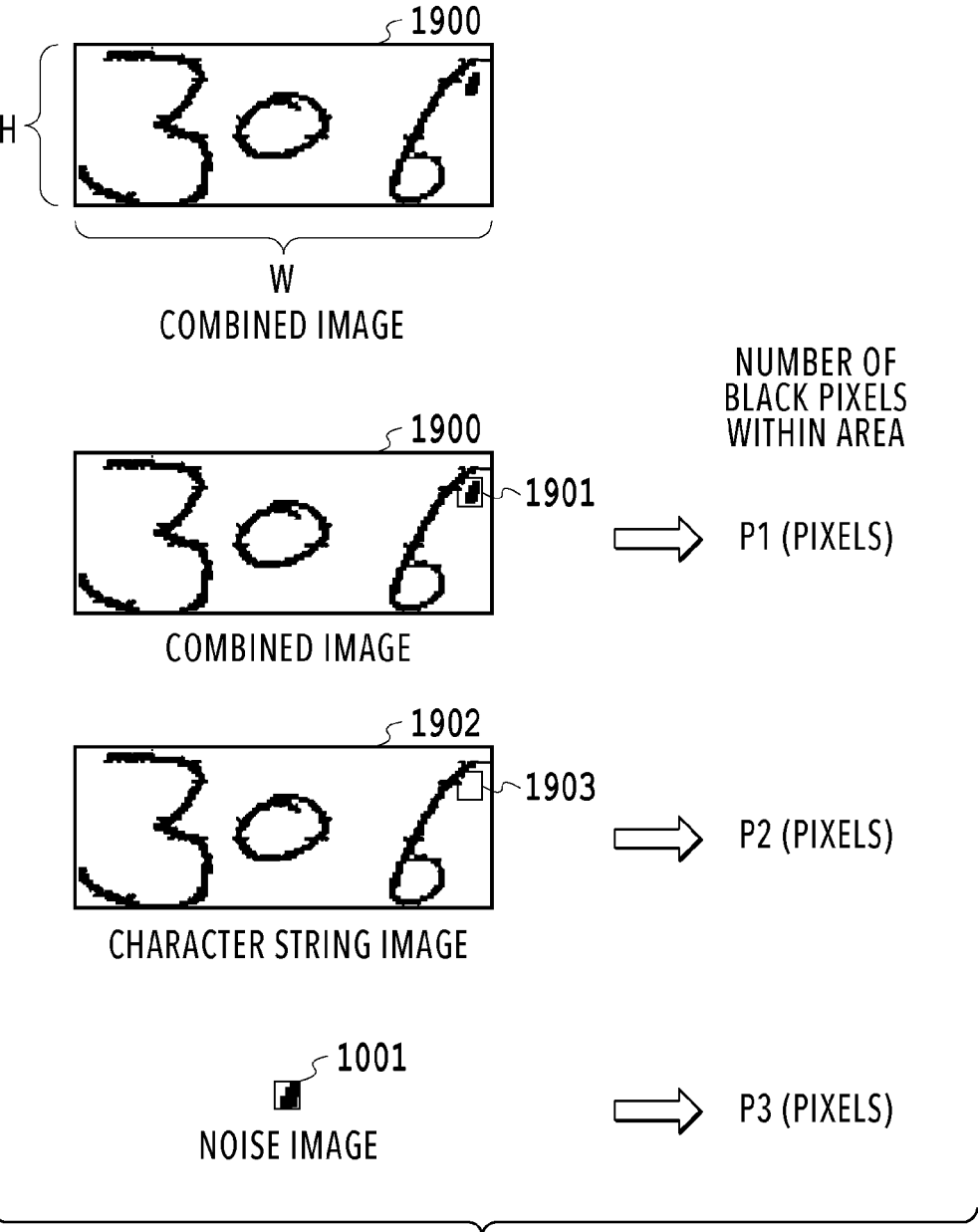
FIG. 19 is a diagram explaining a method of determining contact between a noise pixel and a character pixel.

At S1801, whether or not the noise pixel and the character pixel are in contact in the combined image generated at S711 is determined. Here, with reference to FIG. 19, a contact determination method of a noise pixel and a character pixel is explained. First, a number P1 of black pixels within an area 1901 in which a noise image is superimposed in a combined image 1900 is obtained. Following the above, a number P2 of black pixels within an area 1903 in which a noise image is superimposed within a character string image 1902 before combination is obtained. Here, the coordinates and the size of the area 1903 are the same as those of the area 1901. Next, a number P3 of black pixels within a noise image 1001 is obtained. Then, in a case where a relationship of $P1 < P2 + P3$ holds, it is determined that the noise pixel and the character pixel within the combined image are in contact. This contact determination method is an example and the method is not limited to this. In a case where it is determined that the noise pixel and the character pixel are in contact, the processing advances to S1802 and in a case where it is determined that they are not in contact, the processing advances to S712.

At S1802, the combined image generated at S711 is discarded, that is, removed from the RAM 204. After the combined image is discarded, the processing returns to S703 and the processing is performed again from the generation of a noise image.

The above is the contents of the noise addition processing according to the present embodiment. At S703, it may also be possible to generate a noise image by the method explained in the flowchart in FIG. 11B explained in the second embodiment. Further, it may also be possible to generate a character string image whose frame is extended and arrange a noise image so that the noise image comes into contact with the end portion thereof as explained in the third embodiment, instead of superimposing the noise image on the end portion of the character string image at S711. At that time, it is sufficient to perform superimposition after extending the noise image so that the noise pixel and the character pixel come into contact with each other.

As above, according to the present embodiment, in the noise addition processing, a combined image in which the noise pixel and the character pixel are in contact is generated. By performing training using the combined image thus generated, it is possible to reduce erroneous recognition at the time of using the OCR system that removes an isolated point noise.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to efficiently generate a training image that simulates a character block that is entered by part of a character in another row. As a result of that, it is possible to implement the OCR for handwritten characters, which is capable of recognizing a character with a high accuracy even for a character block entered by part of a character in another row.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-100210, filed Jun. 16, 2021 which are hereby incorporated by reference wherein in its entirety.

What is claimed is:

1. An image processing apparatus comprising:

a memory that stores a program; and a processor that executes the program to perform:

superimposing a noise cut out from another character image in a vicinity of an end portion within a character image representing a handwritten character, wherein the noise is not superimposed in other areas within the character image than the vicinity of the end portion within the character image, wherein in the superimposing, in a case where a noise addition position is a top, the noise is cut out from a bottom end of the character image, and, in a case where the noise addition position is a bottom, the noise is cut out from a top end of the character image; and generating training data by associating a character image in which the noise is superimposed and a correct answer class with each other, wherein the generated training data is used for training of a model of a neural network to ignore the noise and reduce erroneous recognition of the handwritten character.

2. The image processing apparatus according to claim 1, wherein in the superimposing:

processing to extend a frame of the character image is performed; and the noise is superimposed in a vicinity of an end portion within the frame-extended character image, wherein the noise is not superimposed in other areas within the frame-extended character image than the vicinity of the end portion within the frame-extended character image.

3. The image processing apparatus according to claim 2, wherein in the superimposing, a frame is extended in one of upward, downward, leftward, and rightward directions and the noise is superimposed in a vicinity of an end portion in the direction in which the frame is extended, wherein the noise is not superimposed in other areas within the frame-extended character image than the vicinity of the end portion in the direction in which the frame is extended.

4. The image processing apparatus according to claim 1, wherein in the superimposing, in a case where the noise is superimposed in the vicinity of the end portion within the character image, the noise is superimposed so that the noise comes into contact with the end portion.

5. The image processing apparatus according to claim 1, wherein in the superimposing, the noise is superimposed so that a character pixel corresponding to a handwritten character within the character image and a noise pixel corresponding to the noise come into contact with each other.

6. The image processing apparatus according to claim 1, wherein the processor executes the program to perform:

obtaining a rectangular area corresponding to a character described in a document from a scanned image obtained by scanning the document;

separating, in a case where the rectangular area corresponds to a plurality of character rows described in the document, the rectangular area into a rectangular area for each character row; and outputting character recognition results for the rectangular area by estimation using the model which is trained by using the generated training data, wherein in the estimating:

for the rectangular area separated by the separating, the estimation is performed by the model trained by using the generated training data; and for the rectangular area not separated by the separating, the estimation is performed by a trained model which is trained using training data in which the character image to which no noise is superimposed in the superimposing and a correct answer class are associated with each other.

7. The image processing apparatus according to claim 6, wherein the processor executes the program to perform training the model of the neural network by using the generated training data.

8. A control method of an image processing apparatus, the control method comprising:

superimposing a noise cut out from another character image in a vicinity of an end portion within a character image representing a handwritten character, wherein the noise is not superimposed in other areas within the character image than the vicinity of the end portion within the character image, wherein in the superimposing, in a case where a noise addition position is a top, the noise is cut out from a bottom end of the character image, and, in a case where the noise addition position is a bottom, the noise is cut out from a top end of the character image; and generating training data by associating a character image in which the noise is superimposed and a correct answer class with each other, wherein the generated training data is used for training of a model of a neural network to ignore the noise and reduce erroneous recognition of the handwritten character.

9. A non-transitory computer readable storage medium storing a program for causing a computer to perform a control method of an image processing apparatus, the control method comprising:

superimposing a noise cut out from another character image in a vicinity of an end portion within a character image representing a handwritten character, wherein the noise is not superimposed in other areas within the character image than the vicinity of the end portion within the character image, wherein in the superimposing, in a case where a noise addition position is a top, the noise is cut out from a bottom end of the character image, and, in a case where the noise addition position is a bottom, the noise is cut out from a top end of the character image; and generating training data by associating a character image in which the noise is superimposed and a correct answer class with each other, wherein the generated training data is used for training of a model of a neural network to ignore the noise and reduce erroneous recognition of the handwritten character.

10. The image processing apparatus according to claim 1, wherein in the superimposing, in a case where a noise addition position is a left, the noise is cut out from a right end of the character image, and, in a case where the noise addition position is a right, the noise is cut out from a left end of the character image.

\* \* \* \* \*